US012621377B2

(12) United States Patent
Zheng et al.

(10) Patent No.: US 12,621,377 B2
(45) Date of Patent: May 5, 2026

(54) HINGE ASSEMBLY AND FOLDABLE ELECTRONIC DEVICE

(71) Applicant: HONOR DEVICE CO., LTD., Shenzhen (CN)

(72) Inventors: Hansen Zheng, Shenzhen (CN); Wei Zhang, Shenzhen (CN); Lei Feng, Shenzhen (CN); Handong Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 359 days.

(21) Appl. No.: 18/027,761

(22) PCT Filed: Sep. 16, 2022

(86) PCT No.: PCT/CN2022/119450
§ 371 (c)(1),
(2) Date: Mar. 22, 2023

(87) PCT Pub. No.: WO2023/082838
PCT Pub. Date: May 19, 2023

(65) Prior Publication Data
US 2024/0275872 A1 Aug. 15, 2024

(30) Foreign Application Priority Data
Nov. 12, 2021 (CN) .......................... 202111339253.8

(51) Int. Cl.
*H04M 1/00* (2006.01)
*H04M 1/02* (2006.01)
(52) U.S. Cl.
CPC ....... *H04M 1/0216* (2013.01); *H04M 1/0268* (2013.01); *H04M 2201/38* (2013.01)

(58) Field of Classification Search
CPC ............. H04M 1/0216; H04M 1/0268; H04M 2201/38; H04M 1/022; H04M 1/0214;
(Continued)

(56) References Cited

U.S. PATENT DOCUMENTS 11,256,292 B2    2/2022  Xu et al.
11,435,785 B2 *  9/2022  Song ..................... G06F 1/1652
(Continued)

FOREIGN PATENT DOCUMENTS

CN    110324439 A    10/2019
CN    110879643 A    3/2020
(Continued)

*Primary Examiner* — Md K Talukder
(74) *Attorney, Agent, or Firm* — WOMBLE BOND DICKINSON (US) LLP

(57) ABSTRACT

This application provides a hinge assembly and a foldable electronic device. The hinge assembly includes a pivot mechanism and an elastic mechanism disposed on the pivot mechanism. One of the elastic mechanism and a rotation mechanism is fixed to the pivot mechanism, and the other of the elastic mechanism and the rotation mechanism is rotatably connected to the pivot mechanism. One of the elastic mechanism and the rotation mechanism is provided with a plurality of protrusions, and the other of the elastic mechanism and the rotation mechanism is provided with a plurality of grooves that match the plurality of protrusions. When the rotation mechanism rotates to a preset location, at least one of the plurality of protrusions is received by at least one of the plurality of grooves, and remaining protrusions in the plurality of protrusions are interposed between the elastic mechanism and the rotation mechanism.

20 Claims, 13 Drawing Sheets

(58) Field of Classification Search
CPC .... H04M 1/026; G06F 1/1616; G06F 1/1618;
G06F 1/1652; G06F 1/1681
See application file for complete search history.

(56)  References Cited

U.S. PATENT DOCUMENTS

| | | | |
|---|---|---|---|
| 11,467,633 B2 | 10/2022 | Liao et al. | |
| 2016/0085271 A1* | 3/2016 | Morrison | E05D 3/02 |
| | | | 361/679.27 |
| 2016/0147267 A1* | 5/2016 | Campbell | G06F 1/1681 |
| | | | 16/369 |
| 2019/0132975 A1* | 5/2019 | Kim | E05D 11/082 |
| 2021/0181808 A1* | 6/2021 | Liao | H04M 1/0216 |
| 2021/0247814 A1 | 8/2021 | Nguyen et al. | |
| 2021/0333838 A1* | 10/2021 | Song | G06F 1/1652 |
| 2021/0368032 A1* | 11/2021 | Liao | G06F 1/1681 |
| 2022/0035410 A1* | 2/2022 | Lee | G06F 1/1652 |

| | | | |
|---|---|---|---|
| 2022/0116489 A1 | 4/2022 | Nagai et al. | |
| 2022/0303371 A1 | 9/2022 | Liao et al. | |
| 2023/0031086 A1* | 2/2023 | Hung | H05K 5/0226 |
| 2023/0231941 A1* | 7/2023 | Jiang | H04M 1/022 |
| | | | 361/679.01 |
| 2024/0069604 A1* | 2/2024 | Xu | G06F 1/1681 |
| 2024/0275872 A1* | 8/2024 | Zheng | G06F 1/1681 |

FOREIGN PATENT DOCUMENTS

| | | |
|---|---|---|
| CN | 111795059 A | 10/2020 |
| CN | 112153178 A | 12/2020 |
| CN | 112769984 A | 5/2021 |
| CN | 112995368 A | 6/2021 |
| CN | 113124042 A | 7/2021 |
| CN | 213655445 U | 7/2021 |
| CN | 115022429 A | 9/2022 |
| EP | 1767796 A1 | 3/2007 |
| WO | 2021115462 A1 | 6/2021 |

\* cited by examiner

HINGE ASSEMBLY AND FOLDABLE ELECTRONIC DEVICE

CROSS-REFERENCE TO RELATED APPLICATIONS

This application is a national stage of International Application No. PCT/CN2022/119450 filed on Sep. 16, 2022, which claims priority to Chinese Patent Application No. 202111339253.8 filed on Nov. 12, 2021. The disclosures of both of the aforementioned application are hereby incorporated by reference in their entireties.

TECHNICAL FIELD

This application relates to the field of terminal technologies, and in particular, to a hinge assembly and a foldable electronic device.

BACKGROUND

With the continuous development of mobile devices such as mobile phones, large-screen phones are becoming increasingly popular among users. However, large-screen phones are unportable. To resolve this issue, foldable electronic devices, such as foldable phones, are mainly developed to improve the portability. Foldable phones with in-folding and out-folding screens emerge to adapt to differentiated needs of various users.

Currently, a foldable phone usually includes two mechanical parts that are connected by a hinge assembly. In this way, the two mechanical parts can rotate in relation to each other to be open or folded. To enable a folding process of the foldable phone to suspend at all angles, the hinge assembly is usually provided with a damping mechanism that includes a swing arm, a spring, an upper cam, and a lower cam. The upper cam is fixed to the swing arm, and the lower cam is engaged with the upper cam. One end of the spring is fixed, and the other end of the spring touches the lower cam. The spring is configured to support the lower cam. In the folding process, the swing arm rotates and drives the upper cam to rotate. Then, the lower cam is pressed by the upper cam to move downwards and press the spring. When a proper folding angle is reached, the swing arm stops rotating and suspends at the angle due to friction between the upper and lower cams and support from the spring.

However, in the preceding folding process, suspension of the folding process for the foldable phone depends on the friction between the upper and lower cams. Therefore, abrasions may be easily caused to the upper and lower cams. As a result, the life span of the foldable phone is greatly reduced.

SUMMARY

Embodiments of this application provide a hinge assembly and a foldable electronic device. This allows a folding process of the electronic device to suspend at a fixed angle. In addition, the structure is simple, and the issue that abrasions easily occur between an upper cam and a lower cam is resolved.

According to a first aspect of the embodiments of this application, a hinge assembly is provided. The hinge assembly includes a pivot mechanism and an elastic mechanism and a rotation mechanism that are disposed on the pivot mechanism. One of the elastic mechanism and the rotation mechanism is fixed to the pivot mechanism, and the other of the elastic mechanism and the rotation mechanism is rotatably connected to the pivot mechanism. One of the elastic mechanism and the rotation mechanism is provided with a plurality of protrusions, and the other of the elastic mechanism and the rotation mechanism is provided with a plurality of grooves that match the plurality of protrusions. When the rotation mechanism rotates to a preset location, at least one of the plurality of protrusions is received by at least one of the plurality of grooves, and remaining protrusions in the plurality of protrusions are interposed between the elastic mechanism and the rotation mechanism. When the rotation mechanism rotates to another preset location, at least one of the other protrusions in the plurality of protrusions is received by at least one of the other grooves in the plurality of grooves, and remaining protrusions in the plurality of protrusions are interposed between the elastic mechanism and rotation mechanism.

In this embodiment of this application, the hinge assembly is provided with an elastic mechanism. A plurality of protrusions are disposed on one of the elastic mechanism and rotation mechanism, and a plurality of grooves that match the plurality of protrusions are provided on the other of the elastic mechanism and rotation mechanism. The protrusion and the groove that match each other allow the hinge assembly to suspend a folding process at a fixed angle. In a suspension state, the protrusion is received by the groove. Therefore, suspension stability can be ensured. To suspend a folding process of the hinge assembly by using a protrusion and a groove that match each other can avoid usage of a spring, an upper cam, and a lower cam. Therefore, abrasions between the upper cam and the lower cam can be reduced. In addition, less springs require less installation space along an axis of the pivot mechanism. Therefore, the hinge assembly is simplified and costs are reduced.

By the way, the folding process of a foldable terminal usually does not need to be suspended at all angles during usage. There are greater demands for suspension at one angle but zero demands for suspension at another angle. Therefore, the protrusion and the groove are provided on the hinge assembly so that the hinge assembly can suspend a folding process at a fixed angle based on the buckling force between the protrusion and the groove. This reduces abrasions between the elastic mechanism and the rotation mechanism.

In a possible implementation, the rotation mechanism includes a first swing arm and a second swing arm that are disposed at two sides of the pivot mechanism. The elastic mechanism is disposed between the first swing arm and the second swing arm. One of the first swing arm and a first end of the elastic mechanism is provided with a plurality of protrusions, and the other of the first swing arm and the first end of the elastic mechanism is provided with a plurality of grooves that match the plurality of protrusions. One of the second swing arm and a second end of the elastic mechanism is provided with a plurality of protrusions, and the other of the second swing arm and the second end of the elastic mechanism is provided with a plurality of grooves that match the plurality of protrusions.

For the hinge assembly in this embodiment of this application, the first swing arm is provided with a first connection part, and the second swing arm is provided with a second connection part. The elastic piece is located between the first connection part and the second connection part. In this way, the elastic piece can be easily mounted and reliably connected to the first swing arm and the second swing arm. In a possible implementation, the protrusion disposed on the first end of the elastic mechanism is a first protrusion, the protrusion disposed on the second end of the elastic mechanism is a second protrusion, and the first protrusion and the second protrusion are symmetrically disposed along the axis of the pivot mechanism. The groove disposed on the first swing arm is a first groove, the groove disposed on the second swing arm is a second groove, and the first groove and the second groove are symmetrically disposed along the axis of the pivot mechanism.

In a possible implementation, the pivot mechanism includes a first support rod and a second support rod. The first end of the elastic mechanism is passed through by the first support rod, the second end of the elastic mechanism is passed through by the second support rod, and the elastic mechanism is rotatably connected to the first support rod and the second support rods. One end of the first swing arm is passed through by the first support rod, the end of the first swing arm corresponds to the first end of the elastic mechanism, and the first swing arm is fixed to the first support rod. One end of the second swing arm is passed through by the second support rod, the end of the second swing arm corresponds to the second end of the elastic mechanism, and the second swing arm is fixed to the second support rod.

In a possible implementation, the elastic mechanism includes a plurality of elastic pieces, a first end of each elastic piece is provided with a first protrusion, and a second end of the elastic piece is provided with a second protrusion. The first end of the elastic piece is passed through by the first support rod, the second end of the elastic piece is passed through by the second support rod, and the elastic piece is rotatably connected to the first support rod and the second support rod. The first swing arm is provided with the first connection part on which the first groove is disposed. The second swing arm is provided with the second connection part on which the second groove is disposed. The plurality of elastic pieces are disposed between the first connection part and the second connection part.

For the hinge assembly in this embodiment of this application, the elastic mechanism includes a plurality of elastic pieces. This provides at least two positions for suspending the folding process of the hinge assembly. In general, a foldable electronic device needs at least to be fully open and fully folded. In other words, at least two angles are required for suspending the folding process of the foldable electronic device. The plurality of elastic pieces can ensure that the folding process of the foldable electronic device can be suspended at two angles. More elastic pieces allow the folding process of the foldable electronic device to suspend at more angles. This is easy and convenient.

In a possible implementation, an orthographic projection for at least one of the first protrusions provided on the plurality of elastic pieces is alternately distributed on an axis of the first support rod along a circumference of the first support rod. An orthographic projection for at least one of the second protrusions provided on the plurality of elastic pieces is alternately distributed on an axis of the second support rod along a circumference of the second support rod. Orthographic projections for a plurality of first grooves disposed on the first swing arm are overlapped on the axis of the first support rod. Orthographic projections for a plurality of second grooves disposed on the second swing arm are overlapped on the axis of the second support rod.

For the hinge assembly in this embodiment of this application, orthographic projections for a plurality of first protrusions provided on the plurality of elastic pieces are alternately distributed on the axis of the pivot mechanism along the circumference of the first support rod. Orthographic projections for a plurality of second protrusions provided on the plurality of elastic pieces are alternately distributed on the axis of the pivot mechanism along the circumference of the second support rod. In this way, different elastic pieces can be used to determine different suspension positions. Therefore, a plurality of suspension positions can be provided for the hinge assembly, and the folding process of the foldable electronic device can be suspended at different angles. This helps satisfy customer needs.

In a possible implementation, the first connection part includes a plurality of first connection subparts that are alternately distributed and passed through by the first support rod, and the second connection part includes a plurality of second connection subparts that are alternately distributed and passed through by the second support rod. A first end of at least one of the plurality of elastic pieces is disposed between two adjacent first connection subparts, and a second end of at least one of the plurality of elastic pieces is disposed between two adjacent second connection subparts.

For the hinge assembly in this embodiment of this application, the first connection part includes a plurality of alternately distributed first connection subparts, and the second connection part includes a plurality of alternately distributed second connection subparts. In this way, more installation positions are provided for the elastic piece. Therefore, more elastic pieces can be disposed and more suspension angles can be configured to adapt to user needs.

In a possible implementation, respective quantities of first connection subparts and second connection subparts equal a quantity of elastic pieces. A first end of at least one of the plurality of elastic pieces is disposed between two adjacent first connection subparts, and a second end of at least one of the plurality of elastic pieces is disposed between two adjacent second connection subparts. A first end of at least one of the plurality of elastic pieces is disposed at an outside of an outermost first connection subpart, and a second end of at least one of the plurality of elastic pieces is disposed at an outside of an outermost second connection subpart. Each of the plurality of first connection subparts is provided with a first groove, and orthographic projections for first grooves provided on the plurality of first connection subparts are overlapped on the axis of the first support rod. Each of the plurality of second connection subparts is provided with a second groove, and orthographic projections for second grooves provided on the plurality of second connection subparts are overlapped on the axis of the second support rod.

For the hinge assembly in this embodiment of this application, the quantity of first connection subparts or second connection subparts equals the quantity of elastic pieces. In this way; the installation space that is of the elastic piece and that is provided by the first and second swing arms can be fully utilized. Therefore, more elastic pieces can be disposed in same installation space, and the folding process of the foldable electronic device can be suspended at a maximum quantity of angles. This helps satisfy customer needs.

For the hinge assembly in this embodiment of this application, that orthographic projections for the first grooves provided on the plurality of first connection subparts are overlapped on the axis of the pivot mechanism can be understood as that these first grooves are aligned in a straight line along the axis of the pivot mechanism. That orthographic projections for the second grooves provided on the plurality of second connection subparts are overlapped on the axis of the pivot mechanism can be understood as that these second grooves are aligned in a straight line along the axis of the pivot mechanism. This ensures that initial positions of the plurality of first grooves in relation to the plurality of first protrusions on the elastic pieces are the same, and initial positions of the plurality of second grooves in relation to the plurality of second protrusions on the elastic pieces are the same. In this way, when the first swing arm and the second swing arm rotate, starting points of the first and second grooves are located on a same straight line along the pivot mechanism. In other words, the starting points of the first and second grooves are the same. Therefore, a suspension angle of the hinge assembly is controllable, provided that the first and second protrusions on the plurality of elastic pieces are disposed at different locations along the circumference of the pivot mechanism. This is easier when compared with the method that uses positions of four variables, namely, the first groove, the second groove, the first protrusion, and the second protrusion, to control a suspension angle for the hinge assembly. According to a second aspect of the embodiments of this application, a hinge assembly is provided. The hinge assembly includes a pivot mechanism and an elastic mechanism and a rotation mechanism that are disposed on the pivot mechanism. One of the elastic mechanism and the rotation mechanism is fixed to the pivot mechanism, and the other of the elastic mechanism and the rotation mechanism is rotatably connected to the pivot mechanism. One of the elastic mechanism and the rotation mechanism is provided with a protrusion, and the other of the elastic mechanism and the rotation mechanism is provided with a plurality of grooves that match the protrusion. When the rotation mechanism rotates to a preset location, the protrusion is received by one of the plurality of grooves. When the rotation mechanism rotates to another preset location, the protrusion is received by another groove in the plurality of grooves.

In this embodiment of this application, the hinge assembly is provided with an elastic mechanism. A protrusion is disposed on one of the elastic mechanism and rotation mechanism, and a plurality of grooves that match the protrusion are provided on the other of the elastic mechanism and rotation mechanism. The protrusion and the groove that match each other allow the hinge assembly to suspend a folding process at a fixed angle. In a suspension state, the protrusion is received by the groove. Therefore, suspension stability can be ensured. To suspend a folding process of the hinge assembly by using a protrusion and a groove that match each other can avoid usage of a spring, an upper cam, and a lower cam. Therefore, abrasions between the upper cam and the lower cam can be reduced. In addition, less springs require less installation space along an axis of the pivot mechanism. Therefore, the hinge assembly is simplified and costs are reduced.

In a possible implementation, the rotation mechanism includes a first swing arm and a second swing arm that are disposed at two sides of the pivot mechanism. The elastic mechanism is disposed between the first swing arm and the second swing arm. One of the first swing arm and a first end of the elastic mechanism is provided with the protrusion, and the other of the first swing arm and the first end of the elastic mechanism is provided with a plurality of grooves that match the protrusion. One of the second swing arm and a second end of the elastic mechanism is provided with the protrusion, and the other of the second swing arm and the second end of the elastic mechanism is provided with a plurality of grooves that match the protrusion.

For the hinge assembly in this embodiment of this application, the first swing arm is provided with a first connection part, and the second swing arm is provided with a second connection part. The elastic piece is located between the first connection part and the second connection part. In this way, the elastic piece can be easily mounted and reliably connected to the first swing arm and the second swing arm.

In a possible implementation, the protrusion disposed on the first end of the elastic mechanism is a first protrusion, the protrusion disposed on the second end of the elastic mechanism is a second protrusion, and the first protrusion and the second protrusion are symmetrically disposed along the axis of the pivot mechanism. The groove disposed on the first swing arm is a first groove, the groove disposed on the second swing arm is a second groove, and the first groove and the second groove are symmetrically disposed along the axis of the pivot mechanism.

In a possible implementation, the pivot mechanism includes a first support rod and a second support rod. The first end of the elastic mechanism is passed through by the first support rod, the second end of the elastic mechanism is passed through by the second support rod, and the elastic mechanism is rotatably connected to the first support rod and the second support rod. One end of the first swing arm is passed through by the first support rod, the end of the first swing arm corresponds to the first end of the elastic mechanism, and the first swing arm is fixed to the first support rod. One end of the second swing arm is passed through by the second support rod, the end of the second swing arm corresponds to the second end of the elastic mechanism, and the second swing arm is fixed to the second support rod.

In a possible implementation, the elastic mechanism includes an elastic piece, a first end of the elastic piece is provided with the first protrusion, and a second end of the elastic piece is provided with the second protrusion. The first end of the elastic piece is passed through by the first support rod, the second end of the elastic piece is passed through by the second support rod, and the elastic piece is rotatably connected to the first support rod and the second support rod. The first swing arm is provided with the first connection part on which the first groove is disposed. The second swing arm is provided with the second connection part on which the second groove is disposed. The elastic piece is disposed between the first connection part and the second connection part.

In a possible implementation, one elastic piece is provided. A plurality of first grooves on the first swing arm are located on a same plane and alternately distributed along a circumference of the first support rod. A plurality of second grooves on the second swing arm are located on a same plane and alternately distributed along a circumference of the second support rod.

For the hinge assembly in this embodiment of this application, one elastic piece is provided to control suspension at a plurality of angles. This simplifies the hinge assembly, reduces vertical installation space required by the elastic mechanism, and provides installation space for other parts.

In a possible implementation, a plurality of elastic pieces are provided, orthographic projections for all first protrusions disposed on the plurality of elastic pieces are overlapped on an axis of the first support rod, and orthographic projections for all second protrusions disposed on the plurality of elastic pieces are overlapped on an axis of the second support rod. A plurality of first grooves on the first swing arm are located on a plurality of planes, the plurality of planes each include a same quantity of first grooves at same locations, and a plurality of first grooves on the same plane are alternately distributed along a circumference of the first support rod. A plurality of second grooves on the second swing arm are located on a plurality of planes, the plurality of planes each include a same quantity of second grooves at same locations, and a plurality of second grooves on the same plane are alternately distributed along a circumference of the second support rod.

The hinge assembly in this embodiment of this application includes a plurality of elastic pieces. The plurality of elastic pieces can be used to determine one suspension position. This helps improve suspension stability.

In a possible implementation, the first connection part includes a plurality of first connection subparts that are alternately distributed and passed through by the first support rod, and the second connection part includes a plurality of second connection subparts that are alternately distributed and passed through by the second support rod. A first end of at least one elastic piece is disposed between two adjacent first connection subparts, and a second end of at least one elastic pieces is disposed between two adjacent second connection subparts.

In a possible implementation, respective quantities of first connection subparts and second connection subparts equal a quantity of elastic pieces. A first end of at least one elastic piece is disposed between two adjacent first connection subparts, and a second end of at least one elastic piece is disposed between two adjacent second connection subparts. A first end of at least one elastic piece is disposed at an outside of an outermost first connection subpart, and a second end of at least one elastic piece is disposed at an outside of an outermost second connection subpart. Each of the plurality of first connection subparts is provided with a plurality of first grooves of a same quantity. The plurality of first grooves are alternately distributed on a same first connection subpart along the axis of the first support rod and disposed at same locations on different first connection subparts. Each of the plurality of second connection subparts is provided with a plurality of second grooves of a same quantity. The plurality of second grooves are alternately distributed on a same second connection subpart along the axis of the second support rod and disposed at same locations on different second connection subparts.

In a possible implementation, at least two preset locations are provided, and at least one elastic piece is provided at one preset location. Orthographic projections for all first protrusions disposed on the at least one elastic piece at a same preset location are overlapped on the axis of the first support rod, and orthographic projections for all second protrusions disposed on the at least one elastic piece at a same preset location are overlapped on the axis of the second support rod. Orthographic projections for all first grooves at a same preset location are overlapped on the axis of the first support rod, and orthographic projections for all second grooves at a same preset location are overlapped on the axis of the second support rod. Orthographic projections for first protrusions disposed on elastic pieces at different preset locations are alternately distributed on the axis of the first support rod along the circumference of the first support rod, and orthographic projections for second protrusions disposed on elastic pieces at different preset locations are alternately distributed on the axis of the second support rod along the circumference of the second support rod. Orthographic projections for first grooves at different preset locations are alternately distributed on the axis of the first support rod along the circumference of the first support rod, and orthographic projections for second grooves at different preset locations are alternately distributed on the axis of the second support rod along the circumference of the second support rod.

In a possible implementation, the elastic mechanism further includes a limiting structure that touches the elastic piece. The limiting structure includes a limiting member and two springs that are disposed at two ends of the limiting member. One end of the spring touches the elastic piece and the other end of the spring touches the limiting member.

In a possible implementation, one limiting structure is provided, the limiting structure is disposed at outsides of the first swing arm and the second swing arm. One side of the limiting member touches the first support rod and the second support rod, and the other side of the limiting member touches the spring.

In a possible implementation, a plurality of limiting structures are provided. At least one of the limiting structures is disposed at outsides of the first swing arm and the second swing arm, one side of the limiting member touches the first support rod and the second support rod, and the other side of the limiting member touches the spring. At least one of the other limiting structures is disposed between two adjacent first connection subparts and two adjacent second connection subparts, one side of the limiting member touches the first connection subpart and the second connection subpart, and the other side of the limiting member touches the spring.

In a possible implementation, a first through hole and a second through hole are disposed at two ends of the limiting member. The first through hole is passed through by the first support rod, and the second through hole is passed through by the second support rod so that the limiting bracket is rotatably connected to the first support rod and the second support rod. At least one spring is disposed on each of the first support rod and the second support rod.

The hinge assembly in this embodiment of this application includes a limiting structure. The limiting structure can limit positions of the elastic piece, first support rod, and second support rod, and help fix the pivot mechanism to the first swing arm and the second swing arm. The springs are disposed on the side that is of the limiting member and that touches the elastic piece. This can ensure that the elastic piece corresponding to the springs can move along the axis of the pivot mechanism. Therefore, when the first swing arm and the second swing arm rotate to a preset location corresponding to the elastic piece, the first protrusion on the elastic piece connected to the springs can be received by the first groove, and the second protrusion can be received by the second groove. When the first swing arm and the second swing arm rotate to a location other than the preset location corresponding to the elastic piece that is connected to the springs, the first protrusion on the elastic piece leaves the first groove and touches the first swing arm, and the second protrusion leaves the second groove and touches the second swing arm.

In addition, the limiting structure can reduce abrasions caused between the elastic piece and the first swing arm and the second swing arm, and ensure smooth rotation of the first swing arm and the second swing arm. This reduces suspension rigidity. Furthermore, this ensures suspension stability and avoids suspension failures that are caused due to insufficient buckling force.

In a possible implementation, the first connection part is provided with a first mounting hole and the second connection part is provided with a second mounting hole. A first end of the elastic piece is provided with a first connection hole and a second end of the elastic piece is provided with a second connection hole. The first mounting hole and the first connection hole are passed through by the first support rod. The first support rod is fixed to the first swing arm and rotatably connected to the first end of the elastic piece. The second mounting hole and the second connection hole are passed through by the second support rod. The second support rod is fixed to the second swing arm and rotatably connected to the second end of the elastic piece.

For the hinge assembly in this embodiment of this application, the first connection part is provided with the first mounting hole, and the second connection part is provided with the second mounting hole. In this way, the first swing arm can be conveniently fixed to the first support rod of the pivot mechanism, and the second swing arm can be conveniently fixed to the second support rod of the pivot mechanism.

In a possible implementation, a first gear is fixed to one end of the first support rod and a second gear is fixed to one end of the second support rod. Two mutually engaged third gears that each are separately engaged with the first gear and the second gear are disposed between the first swing arm and the second swing arm.

The hinge assembly in this embodiment of this application includes the first gear, second gear, and third gear. This enables synchronous movement between the first swing arm and the second swing arm.

In a possible implementation, the hinge assembly further includes a gear bracket, where a first assembly hole and a second assembly hole are disposed at two ends of the gear bracket. The first assembly hole is passed through by the first support rod, and the second assembly hole is passed through by the second support rod so that the gear bracket is rotatably connected to the first support rod and the second support rod. The gear bracket is disposed at the outsides of the first swing arm and the second swing arm. One side of the gear bracket touches the first, second, and third gears, and the other side of the gear bracket touches the first swing arm and the second swing arm.

The hinge assembly in this embodiment of this application includes the gear bracket. This can provide installation space for the third gear so that the third gear does not fall off. This further ensures normal operation of the hinge assembly.

In a possible implementation, a retaining part is disposed at an end that is of the first swing arm that is connected to the gear bracket. The retaining part extends outwards along outermost end faces of the first connection part and the second connection part. The retaining part touches the gear bracket. The gear bracket is provided with a limiting part that matches the retaining part, the retaining part is disposed at a side that is of the gear bracket and that is close to the first swing arm and the second swing arm, two limiting parts are located at two ends of the gear bracket, and the limiting parts extend on a surface of the gear bracket along directions that are close to the first swing arm and the second swing arm.

In a possible implementation, the limiting part and the retaining part are arc-shaped walls. The retaining part and the limiting part are connected in a fitting manner, and the limiting part can rotate in relation to the retaining part.

The hinge assembly in this embodiment of this application includes the retaining part and the limiting part. The limiting part can rotate for 90° in relation to the retaining part. In this way, the foldable phone can bend inwardly from a fully open state to a fully folded state.

According to a third aspect of the embodiments of this application, a foldable electronic device that at least includes the preceding hinge assembly is provided.

In a possible implementation, the foldable electronic device further includes a foldable first display, a battery cover, a first structure, and a second structure. The first structure and the second structure are located at two sides of the hinge assembly and rotatably connected to a rotation mechanism in the hinge assembly. The battery cover and the first display are located on surfaces at two sides of the hinge assembly, first structure, and second structure.

In a possible implementation, the foldable electronic device further includes a second display. The first display is located on surfaces at one side of the hinge assembly, first structure, and second structure. The second display and the battery cover are located on surfaces at the other side of the first structure and second structure.

The foldable electronic device in this embodiment of this application includes the preceding hinge assembly. This allows the first structure and the second structure to rotate around the hinge assembly and suspend at a fixed angle. In addition, a protrusion can be provided on an elastic mechanism of the hinge assembly, and a groove that matches the protrusion can be provided on a first swing arm and a second swing arm so as to suspend the folding process of the hinge assembly. This can reduce abrasions caused to the hinge assembly of the foldable electronic device. Therefore, the life span of the hinge assembly can be extended. As a result, the life span of the foldable electronic device is extended.

DESCRIPTION OF REFERENCE NUMERALS

100—foldable phone; 10—first display; 10*a*—second display; 11—first display area;
12—second display area; 13—third display area; 21—first structure; 211—first metal plate;
212—first frame; 22—second structure; 221—second metal plate; 222—second frame;
30—rotating shaft assembly; 30*a*—hinge assembly; 31—pivot mechanism; 311—first support rod:; 312—second support rod;
313—first gear; 30*b*—shaft assembly housing; 314—second gear; 315 and 316—third gears; 317—gasket;
32—elastic mechanism; 32*a,* 32*b,* 32*c,* and 32*d*—elastic pieces; 321—first end of an elastic piece; 322—second end of an elastic piece
323—first protrusion; 324—second protrusion; 325—first connection hole; 326—second connection hole; 327—protrusion;
33—rotation mechanism; 331—first swing arm; 3311—first connection part; 3311*a*—first connection subpart;
3311*b*—first mounting hole; 3312—first groove; 3313 and 3413—retaining parts; 332—groove;
341—second swing arm; 3411—second connection part; 3411*a*—first connection subpart;
3411*b*—second mounting hole; 3412—second groove;
35—limiting structure; 351—limiting member; 352 and 353—springs; 354—first through hole; 355—second through hole;
36—gear bracket; 361—first assembly hole; 362—second assembly hole; 363 and 364—limiting parts; and
40—battery cover.

DESCRIPTION OF EMBODIMENTS

Some terms used in implementations of this application are used merely to describe the embodiments of this application, with no intention to limit this application. The implementations in the embodiments of this application are described below with reference to the accompanying drawings.

A foldable electronic device provided in the embodiments of this application may include, but is not limited to, a fixed or mobile terminal that is foldable, such as a mobile phone, a tablet, a notebook computer, an ultra-mobile personal computer (ultra-mobile personal computer, UMPC), a hand-held computer, a touch television, a walkie-talkie, a netbook, a point of sales (POS) terminal, a personal digital assistant (personal digital assistant, PDA), a wearable device, a virtual reality device, or the like.

The embodiments of this application use a foldable phone that includes an in-folding screen and an outer screen as an example to describe the preceding foldable electronic device.

In the following examples, a foldable phone is used as an example to describe the hinge assembly and the foldable electronic device that are provided in the embodiments of this application.

Figure 1:
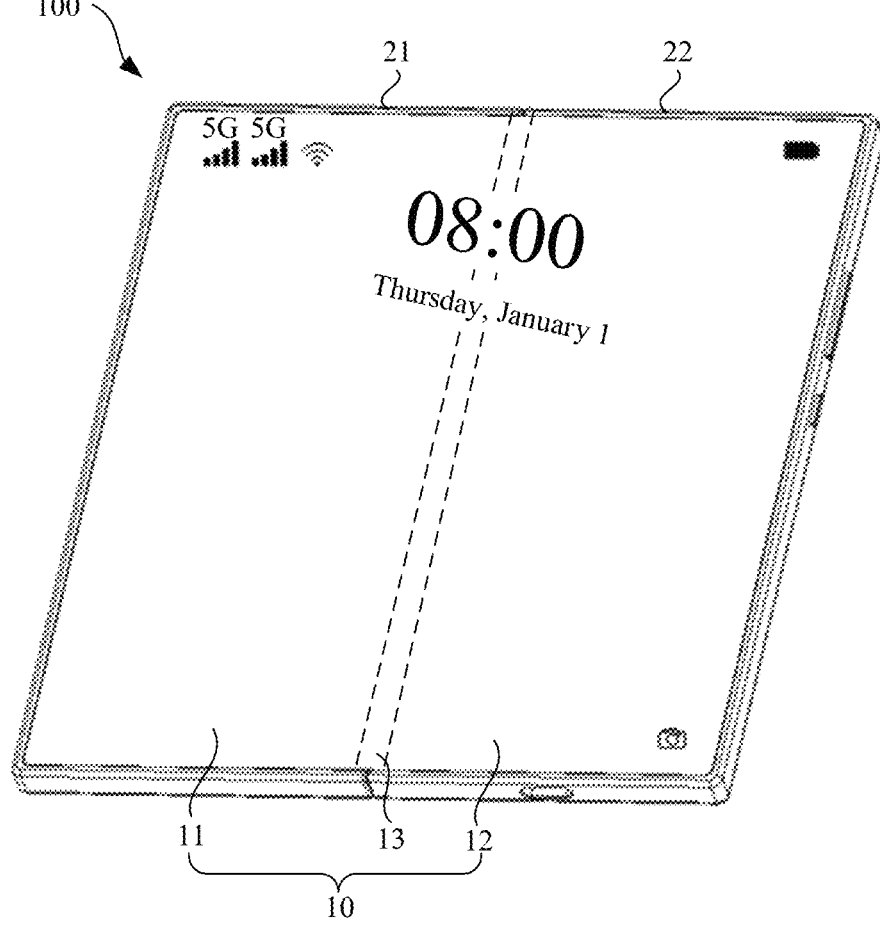
FIG. 1 is a schematic structural diagram of a foldable electronic device in an open state according to an embodiment of this application.
Figure 2:
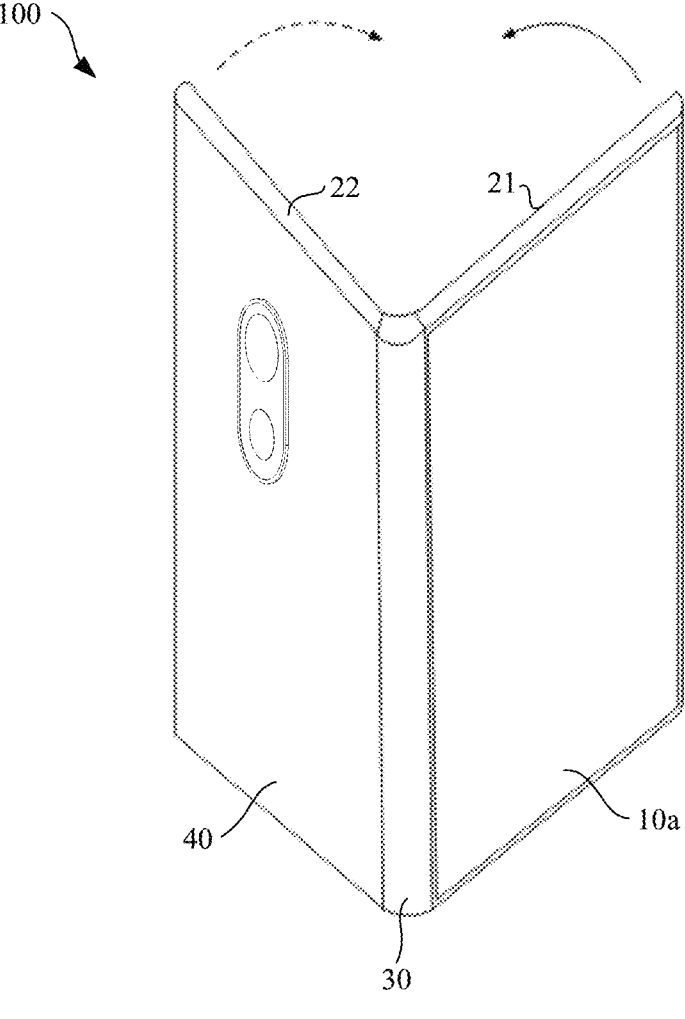
FIG. 2 is a schematic structural diagram of a foldable electronic device in a semi-folded state according to an embodiment of this application.

Referring to FIG. 1 and FIG. 2, a foldable phone 100 may at least include a first structure 21, a second structure 22, a first display 10, a second display 10*a,* a battery cover 40, and a rotating shaft assembly 30. The first structure 21 and the second structure 22 are located at two sides of the rotating shaft assembly 30. The first structure 21 and the second structure 22 are fixed to the rotating shaft assembly 30 and can rotate around the rotating shaft assembly 30 along directions shown by the arrows in the figure. The first display 10 is disposed on surfaces at one side of the first structure 21 and the second structure 22. The second display 10*a* is disposed on the first structure 21. The battery cover 40 is disposed on the second structure 22. The second display 10*a* and the battery cover 40 are located on surfaces at a side that is opposite to the first display 10. The battery cover 40 can further include a through hole for mounting a camera.

In an embodiment of this application, as shown in FIG. 1, the first display 10 may be foldable and include a first display area 11, a second display area 12, and a third display area 13 that is located between the first display area 11 and the second display area 12. The first display area 11 may be disposed on a surface of the first structure 21, the second display area 12 may be disposed on a surface of the second structure 22, and the third display area 13 may be disposed on a surface of the rotating shaft assembly 30.

Referring to FIG. 1 and FIG. 2, the second display 10*a* is opposite to the first display area 11 of the first display 10. The second display 10*a* and the first display area 11 of the first display 10 are located at two sides of the first structure 21. The battery cover 40 and the second display area 12 of the first display 10 can be located at two sides of the second structure 22.

Figure 3:
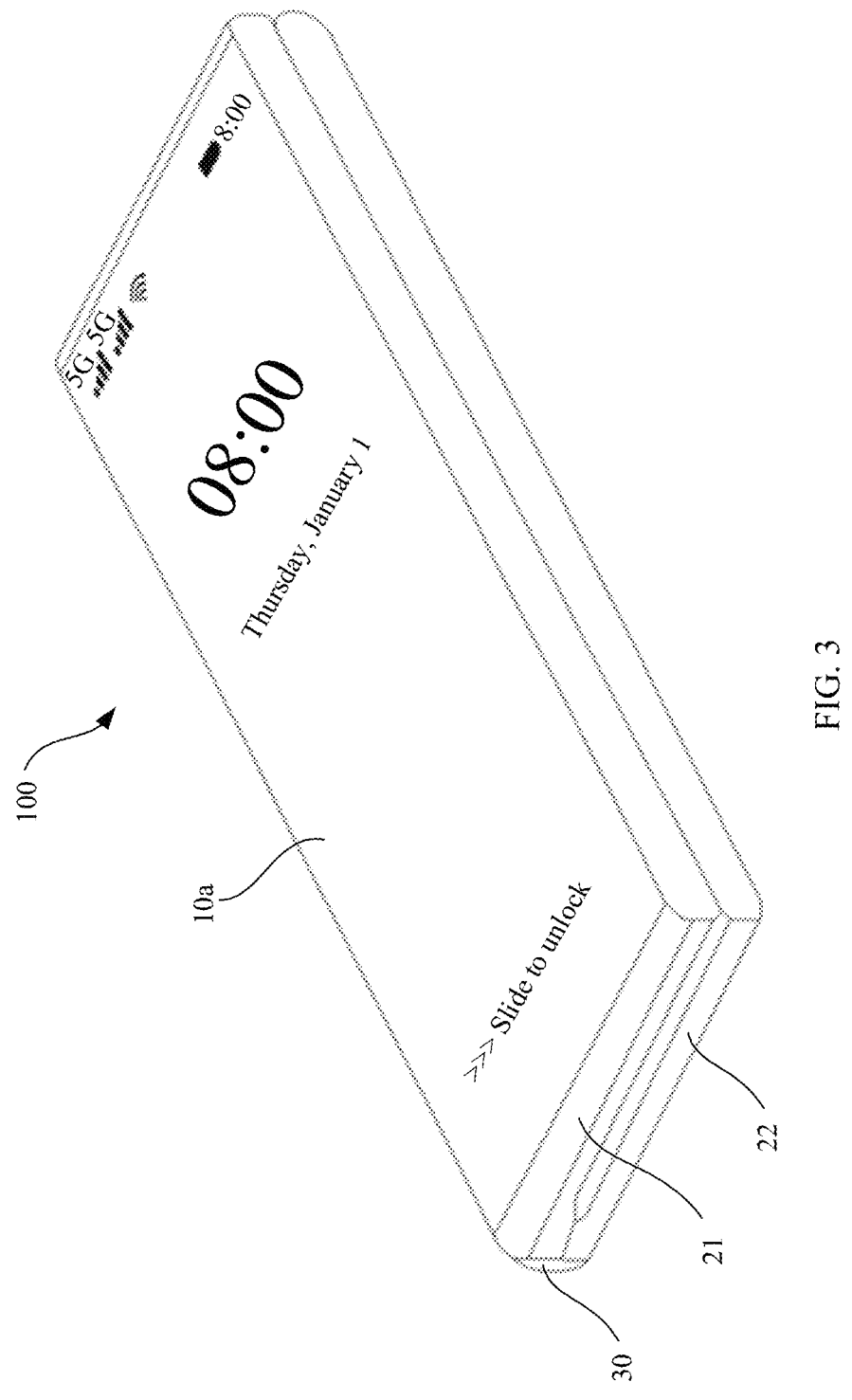
FIG. 3 is a schematic structural diagram of a foldable electronic device in a folded state according to an embodiment of this application.

Referring to FIG. 3, the second display 10*a* can be used as an outer screen if the foldable phone 100 is in a folded state. In some examples, there may be no second display 10*a*. The second display 10*a* may be a liquid crystal display or a flexible display.

Figure 4:
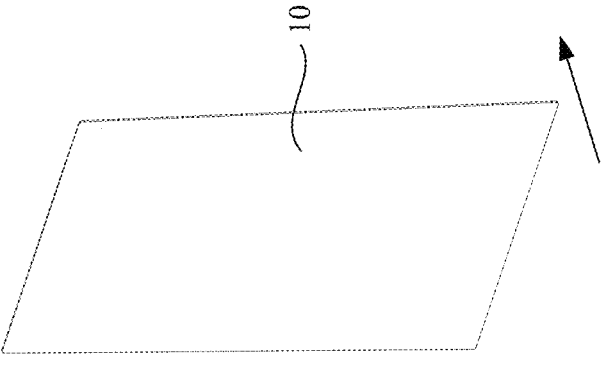
FIG. 4 is an exploded schematic view of a foldable electronic device according to an embodiment of this application.
Figure 4:
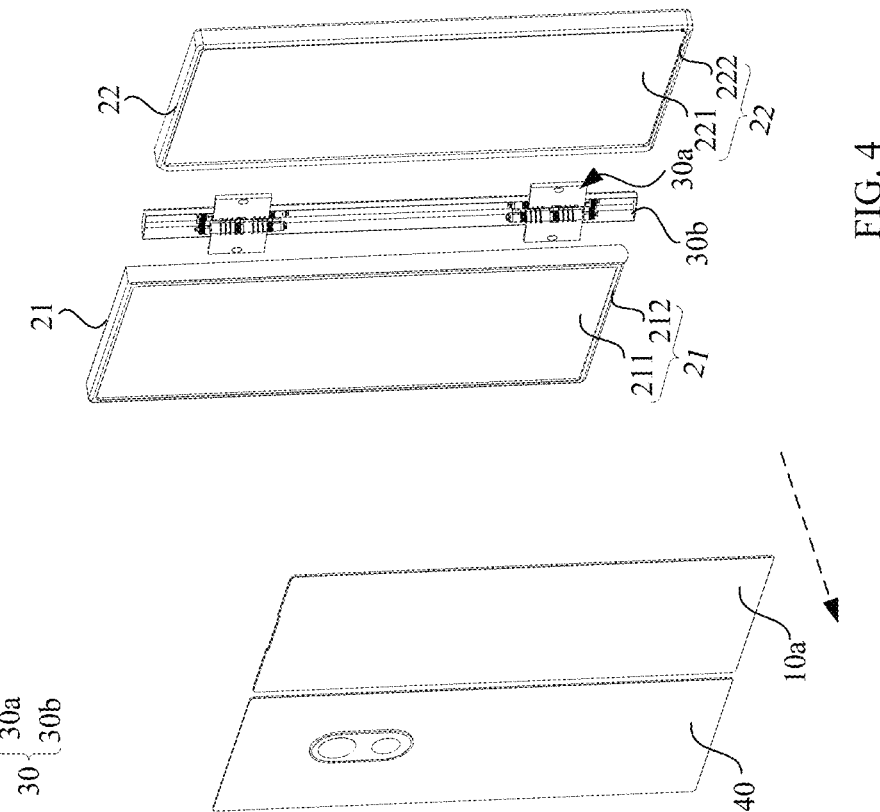
Figure 5:
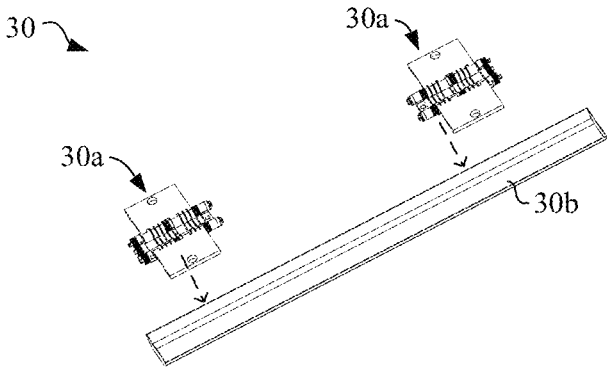
FIG. 5 is an exploded schematic view of a rotating shaft assembly of a foldable electronic device according to an embodiment of this application.

In an embodiment of this application, referring to FIG. 4 and FIG. 5, the rotating shaft assembly 30 includes a shaft assembly housing 30*b* and two hinge assemblies 30*a* that can be disposed within the shaft assembly housing 30*b*. The two hinge assemblies 30*a* are disposed at two ends within the shaft assembly housing 30*b*. The shaft assembly housing 30*b* can be used to protect the hinge assemblies 30*a*. The first structure 21 and the second structure 22 may be middle frames. The first structure 21 may include a first metal plate 211 and a first frame 212 that surrounds outer edges of the first metal plate 211. The second structure 22 may include a second metal plate 221 and a second frame 222 that surrounds outer edges of the second metal plate 221. The hinge assembly 30*a* may be fixed to the first metal plate 211 and the second metal plate 221. It should be noted that the first structure 21 and the second structure 22 can be fixed to the hinge assembly 30a by using methods such as welding, adhesive bonding, or screw locking. The first structure 21 and the second structure 22 can fold towards each other inwardly or outwardly along an axis of the hinge assembly 30a in a simultaneous manner. If the first structure 21 and the second structure 22 are folded on top of each other, the foldable phone 100 is in the folded state. If the first structure 21 and the second structure 22 rotate backwards from the folded state to a state in which the first and second structures can no longer rotate (for example, the two structures are on a same plane), the foldable phone is in an open state. The process from the folded state to the open state is an opening process, and the process from the open state to the folded state is a folding process.

In addition, in an embodiment of this application, there may be one first structure 21 and one second structure 22 so that the foldable phone can be folded into two layers. Specifically, as shown in FIG. 1, the foldable phone may include only one first structure 21, one second structure 22, and the rotating shaft assembly 30 that connects the first structure 21 and the second structure 22. As shown in FIG. 3, the first structure 21 and the second structure 22 can rotate in relation to each other to be folded on top of each other. In this case, the foldable phone 100 is folded into two layers.

It should be noted that there may include, but is not limited to, one first structure 21 and one second structure 22. In some embodiments, there may be a plurality of first structures 21 and a plurality of second structures 22 (not shown in the figure), and the rotating shaft assembly 30 is disposed between each pair of first structure 21 and second structure 22. In this way, the foldable phone 100 can be folded into multiple layers. For example, the foldable phone 100 may include two second structures 22, one first structure 21, and two rotating shaft assemblies 30. The two second structures 22 are located at two sides of the first structure 21 and rotatably connected to the first structure 21 by the rotating shaft assemblies 30. Each of the two second structures 22 can rotate in relation to the first structure 21 until the second structure 22 and the first structure 21 are folded on top of each other. In this way, the foldable phone 100 can be folded into three layers. If two structures in the one first structure 21 and two second structures 22 rotate to a state in which the two structures are located on a same plane, the foldable phone 100 is in a fully open state.

In some embodiments, the foldable electronic device may also be a notebook computer. The notebook computer may also include a first structure and a second structure. The first structure and the second structure can rotate in relation to each other so as to be folded on top of each other. In this case, the notebook computer is in the folded state. Reversely, the first structure and the second structure can rotate backwards from the folded state to a state in which the first and second structures can no longer rotate. In this case, the notebook computer is in the open state. In the open state, a part of the foldable first display on the first structure can be used to display images, and a part of the foldable first display on the second structure can be used as a virtual keyboard.

The following describes the hinge assembly 30a of the preceding foldable phone 100 in the embodiments of this application in detail.

Figure 6:
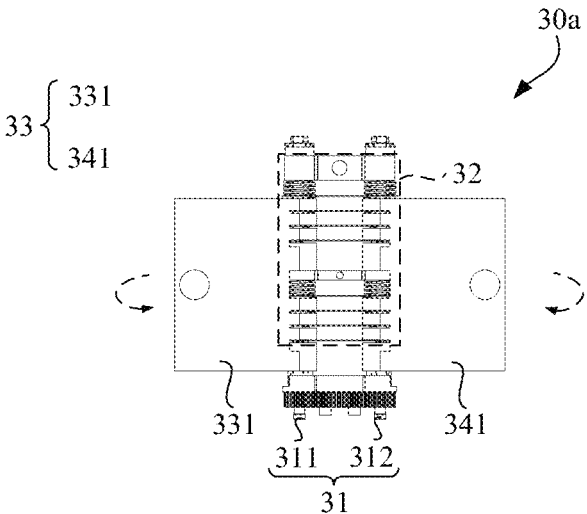
FIG. 6 is a schematic structural diagram of a hinge assembly of a foldable electronic device according to an embodiment of this application.

As shown in FIG. 6, the hinge assembly 30a may include a pivot mechanism 31 and an elastic mechanism 32 and a rotation mechanism 33 that are disposed on the pivot mechanism 31. One of the elastic mechanism 32 and the rotation mechanism 33 is fixed to the pivot mechanism 31, and the other of the elastic mechanism 32 and the rotation mechanism 33 is rotatably connected to the pivot mechanism 31.

As shown in FIG. 6, the rotation mechanism 33 may include a first swing arm 331 and a second swing arm 341 that are symmetrically disposed at two sides of the pivot mechanism 31. The first swing arm 331 and the second swing arm 341 can rotate in relation to the elastic mechanism 32 along directions shown by the two dashed arrows in FIG. 6.

In an embodiment of this application, as shown in FIG. 6, the pivot mechanism 31 may include a first support rod 311 and a second support rod 312. The elastic mechanism 32 is rotatably connected to the pivot mechanism 31 and located between the first swing arm 331 and the second swing arm 341. A first end of the elastic mechanism 32 is passed through by the first support rod 311. A second end of the elastic mechanism 32 is passed through by the second support rod 312. One end of the first swing arm 331 is passed through by the first support rod 311, and the end of the first swing arm corresponds to the first end of the elastic mechanism 32. One end of the second swing arm 341 is passed through by the second support rod 312, and the end of the second swing arm corresponds to the second end of the elastic mechanism 32. The first swing arm 331 is fixed to the first support rod 311, and the second swing arm 341 is fixed to the second support rod 312.

Figure 7:
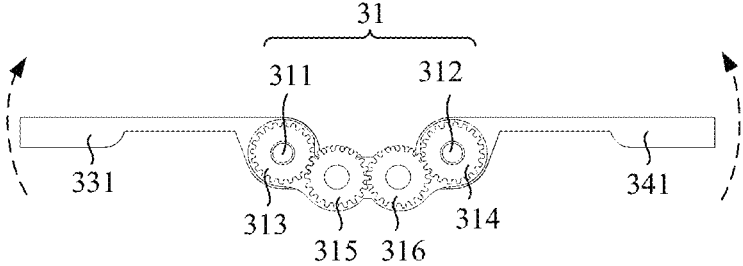
FIG. 7 is a bottom view of a hinge assembly that is of a foldable electronic device and that switches from an open state to a folded state according to an embodiment of this application.
Figure 7:
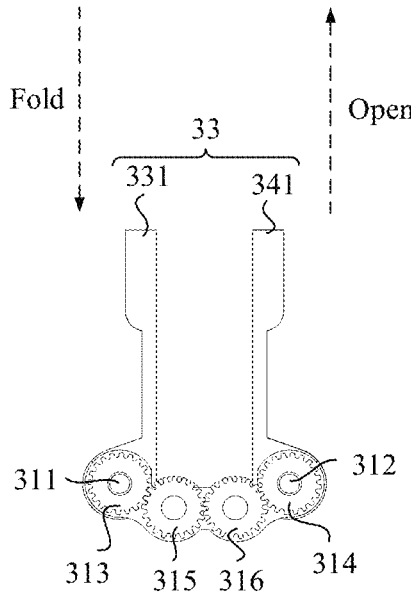

In an embodiment of this application, as shown in FIG. 7, a first gear 313 is fixed to one end of the first support rod 311 and a second gear 314 is fixed to one end of the second support rod 312. Two mutually engaged third gears 315 and 316 that each are separately engaged with the first gear 313 and the second gear 314 are disposed between the first swing arm 331 and the second swing arm 341. The first swing arm 331 is fixed to the first support rod 311, and the first gear 313 is also fixed to the first support rod 311. Therefore, rotation of the first swing arm 331 drives rotation of the first support rod 311 and then rotation of the first gear 313.

The following describes a process of linkage between the first gear 313, second gear 314, third gear 315, and third gear 316 by using clockwise rotation of the first swing arm 331 as an example. The clockwise rotation of the first swing arm 331 drives clockwise rotation of the first gear 313. Then, the clockwise rotation of the first gear 313 drives counterclockwise rotation of the third gear 315 engaged with the first gear 313. Next, the counterclockwise rotation of the third gear 315 drives clockwise rotation of the third gear 316 engaged with the second gear 314. Finally, the clockwise rotation of the third gear 316 drives counterclockwise rotation of the second gear 314. The second gear 314 is fixed to the second support rod 312, and the second support rod 312 is fixed to the second swing arm 341. Therefore, the second swing arm 341 rotates counterclockwise. It can be learned from the above that the first gear 313 and the second gear 314 can rotate simultaneously along opposite directions. In other words, the first swing arm 331 and the second swing arm 341 can rotate simultaneously along opposite directions.

As shown in FIG. 7, the first swing arm 331 and the second swing arm 341 are in the fully open state. In this case, an included angle between a plane on which the first swing arm 331 resides and a plane on which the second swing arm 341 resides is 180°. When the first swing arm 331 and the second swing arm 341 are fully folded on top of each other, an included angle between the plane on which the first swing arm 331 resides and the plane on which the second swing arm 341 resides can be 0°. In this case, the first swing arm 331 and the second swing arm 341 each have rotated for 90° around the pivot mechanism 31 along directions close to each other.

It should be noted that, when the first swing arm 331 and the second swing arm 341 are fully folded on top of each other, the included angle between the plane on which the first swing arm 331 resides and the plane on which the second swing arm 341 resides can be, but is not limited to, 0°. In some embodiments, for example, the first display 10 is a waterdrop notch display. When the first swing arm 331 and the second swing arm 341 are fully folded on top of each other, the included angle between the plane on which the first swing arm 331 resides and the plane on which the second swing arm 341 resides may be greater than 0°. In this case, the first swing arm 331 and the second swing arm 341 each have rotated for more than 90° around the pivot mechanism 31 along directions close to each other.

Figure 8:
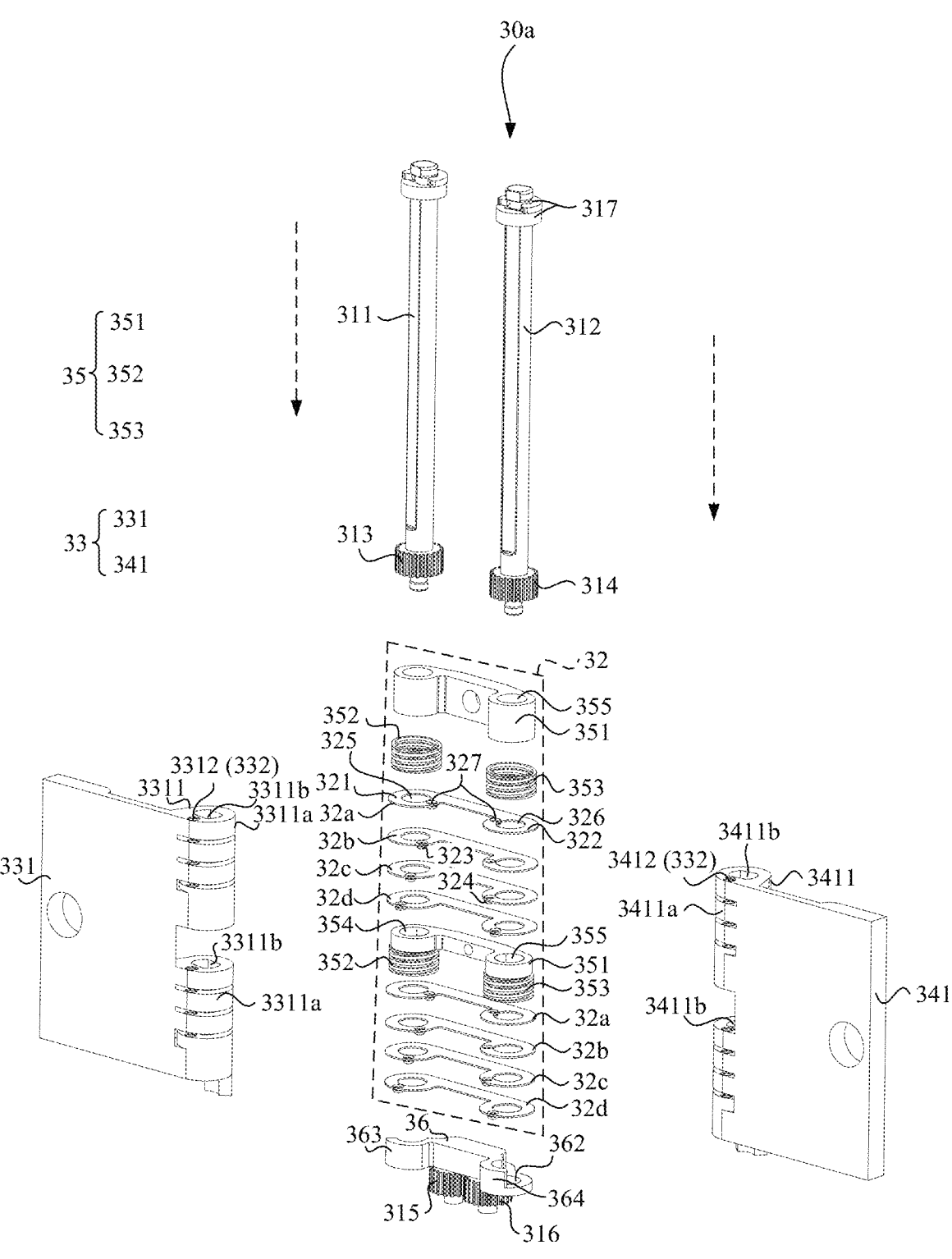
FIG. 8 is an exploded schematic view of a hinge assembly of a foldable electronic device according to an embodiment of this application.

In an embodiment of this application, as shown in FIG. 8, a hinge assembly 30a includes an elastic mechanism 32, a first swing arm 331, a second swing arm 341, a first support rod 311, and a second support rod 312. The elastic mechanism 32 is disposed between the first swing arm 331 and the second swing arm 341. The first support rod 311 and the second support rod 312 pass through the first swing arm 331, the second swing arm 341, and the elastic mechanism 32. The elastic mechanism 32 is provided with a protrusion 327. The protrusion 327 disposed at a first end of the elastic mechanism 32 is a first protrusion 323. The protrusion 327 disposed at a second end of the elastic mechanism 32 is a second protrusion 324. The first protrusion 323 and the second protrusion 324 are symmetrically disposed along an axis of the pivot mechanism 31. The first swing arm 331 and the second swing arm 341 each are provided with a groove 332. The groove 332 disposed on the first swing arm 331 is a first groove 3312. The groove 332 disposed on the second swing arm 341 is a second groove 3412. The first groove 3312 and the second groove 3412 are symmetrically disposed along the axis of the pivot mechanism 31. An end that is of the elastic mechanism 32 and that is close to the first swing arm 331 is the first end of the elastic mechanism 32. An end that is of the elastic mechanism 32 and that is close to the second swing arm 341 is the second end of the elastic mechanism 32.

As shown in FIG. 8, the first swing arm 331 is provided with a first connection part 3311. The first connection part 3311 may further include eight first connection subparts 3311a that are alternately distributed along the axis of the pivot mechanism 31. The eight first connection subparts 3311a are passed through by and fixed to the first support rod 311. The second swing arm 341 is provided with a second connection part 3411. The second connection part 3411 includes eight second connection subparts 3411a that are alternately distributed along the axis of the pivot mechanism 31. The eight second connection subparts 3411a are passed through by and fixed to the second support rod 312. Each first connection subpart 3311a is provided with one first groove 3312, and each second connection subpart 3411a is provided with one second groove 3412.

As shown in FIG. 8, the elastic mechanism 32 includes upper elastic pieces 32a, 32b, 32c, and 32d and lower elastic pieces 32a, 32b, 32c, and 32d. The elastic pieces 32a, 32b, 32c, and 32d can be disposed between the first connection part 3311 and the second connection part 3411.

Figure 9:
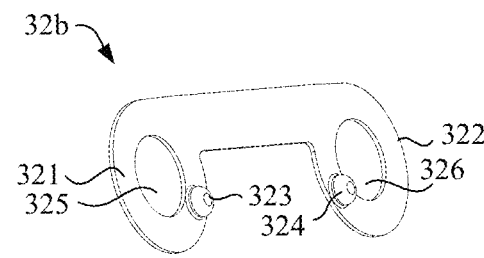
FIG. 9 is a schematic structural diagram of an elastic piece in a hinge assembly of a foldable electronic device according to an embodiment of this application.

Referring to FIG. 8 and FIG. 9, a first end 321 of each elastic piece is provided with one first protrusion 323 and a first connection hole 325. A second end 322 of the elastic piece is provided with one second protrusion 324 and a second connection hole 326. An end that is of the elastic piece and that is close to the first swing arm 331 is the first end 321 of the elastic piece. An end that is of the elastic piece and that is close to the second swing arm 341 is the second end 322 of the elastic piece.

In this embodiment, the first connection part 3311 is provided with a first mounting hole 3311b, and the second connection part 3411 is provided with a second mounting hole 3411b. The first support rod 311 passes through the first mounting hole 3311b and the first connection hole 325. The first support rod 311 is fixed to the first swing arm 331 and rotatably connected to the first end 321 of the elastic piece. The second support rod 312 passes through the second mounting hole 3411b and the second connection hole 326. The second support rod 312 is fixed to the second swing arm 341 and rotatably connected to the second end 322 of the elastic piece. The hinge assembly 30a is structurally symmetric along the axis of the pivot mechanism 31.

As shown in FIG. 8, in this embodiment, the first mounting hole 3311b and the second mounting hole 3411b are oblong holes. Specifically, two opposite end faces of the oblong hole are planes parallel to each other, while the other two opposite end faces of the oblong hole are arc-shaped surfaces. A cross section of where the first support rod 311 is connected to the first connection part 3311 is in the same shape as the first mounting hole 3311b so that the first support rod 311 can be fixed to the first connection part 3311. In this way, when the first swing arm 331 rotates, the first support rod 311 can rotate along with the first swing arm 331. A cross section where the second support rod 312 is connected to the second connection part 3411 is in the same shape as the second mounting hole 3411b so that the second support rod 312 can be fixed to the second connection part 3411. In this way, when the second swing arm 341 rotates, the second support rod 312 can rotate along with the second swing arm 341.

As shown in FIG. 8, the first connection hole 325 and the second connection hole 326 are circular holes and have inner diameters greater than those of the first mounting hole 3311b and the second mounting hole 3411b. In addition, the inner diameters of the first connection hole 325 and the second connection hole 326 are greater than outer diameters of the first support rod 311 and the second support rod 312. This ensures that the elastic piece can be rotatably connected to the first support rod 311 and the second support rod 312.

It should be noted that the first mounting hole 3311b and the second mounting hole 3411b can be, but are not limited to, oblong holes. In some examples, the first mounting hole 3311b and the second mounting hole 3411b can be holes of other shapes, provided that the first connection part 3311 can be fixed to the first support rod 311 and the second connection part 3411 can be rotatably connected to the second support rod 312. The first connection hole 325 and the second connection hole 326 can be, but are not limited to, circular holes. In some examples, the first connection hole 325 and the second connection hole 326 can be holes of other shapes such as squares, ellipses, or pentagons, provided that the elastic piece can be fixed to the first support rod 311 and the second support rod 312.

As shown in FIG. 8, in this embodiment, eight elastic pieces, eight first connection subparts 3311a, and eight second connection subparts 3411a are provided. During assembly, the first end 321 of each of the elastic pieces is passed through by and rotatably connected to the first support rod 311. Each of the first connection subparts 3311a is passed through by and fixed to the first support rod 311. The second end 322 of each of the elastic pieces is passed through by and rotatably connected to the second support rod 312. Each of the second connection subparts 3411*a* is passed through by and fixed to the second support rod 312. The first groove 3312 is located on a top surface of the first connection subpart 3311*a*, and the second groove 3412 is located on a top surface of the second connection subpart 3411*a*. The first protrusion 323 is opposite to the first groove 3312. In this way, when the second swing arm 331 rotates, the first protrusion 323 can be received by the first groove 3312. The second protrusion 324 is opposite to the second groove 3412. In this way, when the second swing arm 341 rotates, the second protrusion 324 can be received by the second groove 3412.

Figure 10:
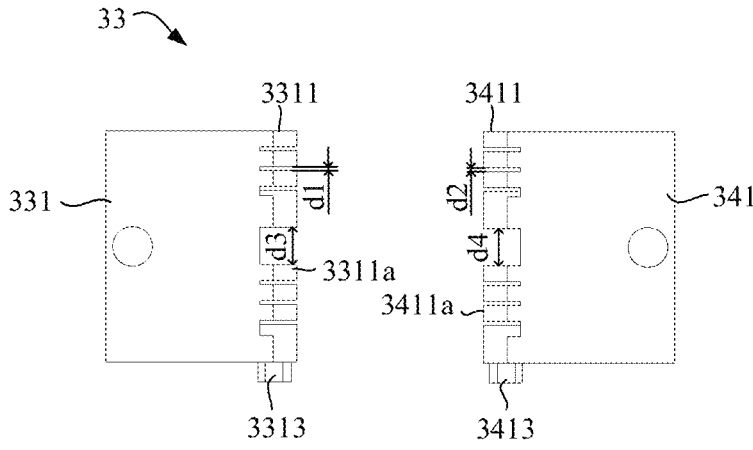
FIG. 10 is a schematic structural diagram of a rotation mechanism in a hinge assembly of an electronic device according to an embodiment of this application.

As shown in FIG. 10, in this embodiment, the first swing arm 331 and the second swing arm 341 are symmetrically disposed along the axis of the pivot mechanism 31. Quantities and shapes of the first connection subparts 3311*a* and the second connection subparts 3411*a* are the same. Quantities of the first connection subparts 3311*a* and the elastic pieces are the same. There is a first gap d1 between two adjacent first connection subparts 3311*a* and a second gap d2 between two adjacent second connection subparts 3411*a*. A width of d1 equals a width of d2. An elastic piece is disposed between the first gap and the second gap that are located on a same plane. In addition, an elastic piece is also disposed between an outermost first connection subpart 3311*a* of the first swing arm 331 and an outermost second connection subpart 3411*a* of the second swing arm 341.

Referring to FIG. 8 and FIG. 10, there are eight first connection subparts 3311*a* on the first connection part 3311 of the first swing arm 331. Four first connection subparts 3311*a* constitute one group, and a third gap d3 is disposed between two groups of first connection subparts 3311*a*. There are eight second connection subparts 3411*a* on the second connection part 3411 of the second swing arm 341. Four second connection subparts 3411*a* constitute one group, and a fourth gap d4 is disposed between two groups of second connection subparts 3411*a*. A width of d3 equals a width of d4. Protrusions on the upper four elastic pieces in the eight elastic pieces are arranged in a same manner as that for the lower four elastic pieces. The following uses the upper four elastic pieces 32*a*, 32*b*, 32*c*, and 32*d*, upper four first connection subparts 3311*a*, and upper four second connection subparts 3411*a* as examples for description.

Figure 11:
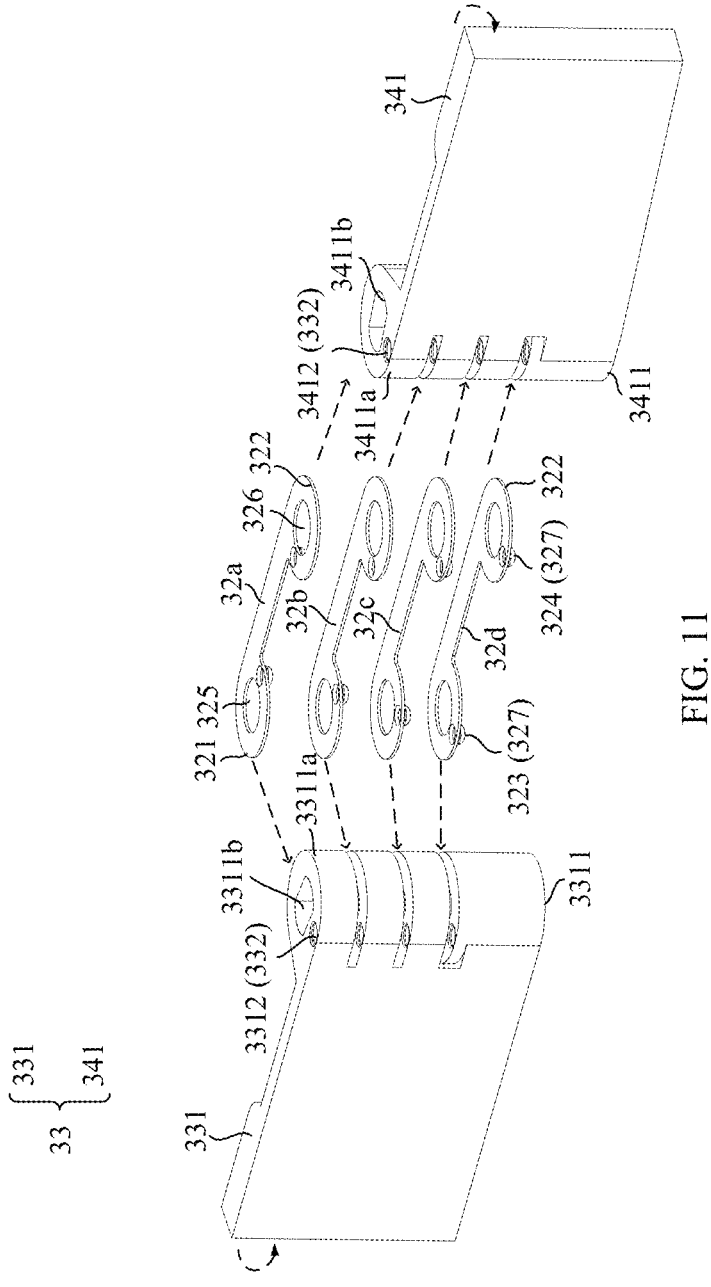
FIG. 11 is an exploded schematic view of some elastic pieces and a part of a rotation mechanism in the hinge assembly in FIG. 8.

As shown in FIG. 11, each first connection subpart 3311*a* is provided with one first groove 3312. Orthographic projections for four first grooves 3312 on the four first connection subparts 3311*a* are overlapped on the axis of the pivot mechanism 31. Each second connection subpart 3411*a* is provided with one second groove 3412. Orthographic projections for four second grooves 3412 on the four second connection subparts 3411*a* are overlapped on the axis of the pivot mechanism 31. Orthographic projections for four first protrusions 323 on the elastic pieces 32*a*, 32*b*, 32*c*, and 32*d* are alternately distributed on an axis of the first support rod 311 along a circumference of the first support rod 311. Orthographic projections for four second protrusions 324 on the elastic pieces 32*a*, 32*b*, 32*c*, and 32*d* are alternately distributed on an axis of the second support rod 312 along a circumference of the second support rod 312. It should be noted that the first protrusion 323 and the second protrusion 324 are symmetrically disposed on each elastic piece. The elastic pieces 32*a*, 32*b*, 32*c*, and 32*d* are disposed on the first connection subpart 3311*a* and the second connection subpart 3411*a* from top to bottom. Specifically, the elastic piece 32*a* is disposed on the top of the first swing arm 331 and the second swing arm 341. The elastic piece 32*b* is disposed in a first first gap and a first second gap from the top. The elastic piece 32*c* is disposed in a second first gap and a second second gap from the top. The elastic piece 32*d* is disposed in a third first gap and a third second gap from the top. The elastic pieces 32*a*, 32*b*, 32*c*, and 32*d* each define a preset location. In actual implementation, when the first swing arm 331 and the second swing arm 341 rotate to a preset location, the first protrusion 323 on the elastic piece 32*a* can be received by the first groove 3312 corresponding to the elastic piece 32*a*. The first protrusions 323 on the elastic pieces 32*b*, 32*c*, and 32*d* are interposed between the first end 321 of the elastic piece and the first swing arm 331. The second protrusion 324 on the elastic piece 32*a* can be received by the second groove 3412 corresponding to the elastic piece 32*a*. The second protrusions 324 on the elastic pieces 32*b*, 32*c*, and 32*d* are interposed between the second end 322 of the elastic piece and the second swing arm 341.

When the first swing arm 331 and the second swing arm 341 rotate to another preset location, the first protrusion 323 on the elastic piece 32*b* can be received by the first groove 3312 corresponding to the elastic piece 32*b*. The first protrusions 323 on the elastic pieces 32*a*, 32*c*, and 32*d* are interposed between the first end 321 of the elastic piece and the first swing arm 331. The second protrusion 324 on the elastic piece 32*b* can be received by the second groove 3412 corresponding to the elastic piece 32*b*. The second protrusions 324 on the elastic pieces 32*a*, 32*c*, and 32*d* are interposed between the second end 322 of the elastic piece and the second swing arm 341.

When the first swing arm 331 and the second swing arm 341 rotate to a third preset location, the first protrusion 323 on the elastic piece 32*c* can be received by the first groove 3312 corresponding to the elastic piece 32*c*. The first protrusions 323 on the elastic pieces 32*a*, 32*b*, and 32*d* are interposed between the first end 321 of the elastic piece and the first swing arm 331. The second protrusion 324 on the elastic piece 32*c* can be received by the second groove 3412 corresponding to the elastic piece 32*c*. The second protrusions 324 on the elastic pieces 32*a*, 32*b*, and 32*d* are interposed between the second end 322 of the elastic piece and the second swing arm 341.

When the first swing arm 331 and the second swing arm 341 rotate to a fourth preset location, the first protrusion 323 on the elastic piece 32*d* can be received by the first groove 3312 corresponding to the elastic piece 32*d*. The first protrusions 323 on the elastic pieces 32*a*, 32*b*, and 32*c* are interposed between the first end 321 of the elastic piece and the first swing arm 331. The second protrusion 324 on the elastic piece 32*d* can be received by the second groove 3412 corresponding to the elastic piece 32*d*. The second protrusions 324 on the elastic pieces 32*a*, 32*b*, and 32*c* are interposed between the second end 322 of the elastic piece and the second swing arm 341.

It should be noted that the foldable phone must be at least fully open and fully folded. Therefore, at least two first grooves and two second grooves must be provided, and two elastic pieces can be provided. In this embodiment, the elastic mechanism can include at least two elastic pieces. The first end of each of the two elastic pieces is provided with one first protrusion. An included angle between orthographic projections for the two first protrusions on the axis of the pivot mechanism can be 90°. The second end of each of the two elastic pieces is provided with one second protrusion. An included angle between orthographic projections for the two second protrusions on the axis of the pivot mechanism can be 90°. The first swing arm is provided with two first grooves. Orthographic projections for the two first grooves on the axis of the pivot mechanism are overlapped. The second swing arm is provided with two second grooves. Orthographic projections for the two second grooves on the axis of the pivot mechanism are overlapped.

It should be noted that, in some embodiments, for example, the first display or the second display is a water-drop notch display. In this case, the included angle between the orthographic projections for the two first protrusions 323 on the axis of the pivot mechanism 31 can be greater than 90°. The included angle between the orthographic projections for the two second protrusions 324 on the axis of the pivot mechanism 31 can also be greater than 90°. Therefore, the included angle between the orthographic projections for the two first protrusions 323 on the axis of the pivot mechanism 31 does not limit the protection scope of the technical solutions provided in this application.

It should be noted that there may be, but not limited to, eight first connection subparts 3311*a* and eight second connection subparts 3411*a*. In some examples, there may be zero first connection subpart 3311*a* and zero second connection subpart 3411*a*. Alternatively, there may be two, three, four, or five first connection subparts 3311*a* and two, three, four, or five second connection subparts 3411*a*. Specific quantities of first connection subparts 3311*a* and second connection subparts 3411*a* can be determined based on actual conditions, which is not elaborated herein.

In this embodiment, referring to FIG. 8, the elastic mechanism 32 further includes a limiting structure 35. Each limiting structure 35 includes a limiting member 351 and springs 352 and 353. The springs 352 and 353 are disposed at two ends of the limiting member 351. Each of the springs 352 and 353 has one end that touches the elastic piece 32*a* and the other end that touches the limiting member 351. The limiting structure 35 is disposed at outsides of the first swing arm 331 and the second swing arm 341. One side of the limiting member 351 may touch the first support rod 311 and the second support rod 312. The other side of the limiting member 351 touches the springs 352 and 353. Alternatively, the limiting structure 35 is disposed between two adjacent first connection subparts 3311*a* and two adjacent second connection subparts 3411*a*. One side of the limiting member 351 touches the first connection subpart 3311*a* and the second connection subpart 3411*a*. The other side of the limiting member 351 touches the springs 352 and 353.

In this embodiment, the limiting structure 35 disposed at the outsides of the first swing arm 331 and the second swing arm 341 can prevent the elastic piece 32*a* from directly touching the first support rod 311 and the second support rod 312. When the hinge assembly 30*a* is assembled, the tightness of the hinge assembly 30*a* must be ensured. Therefore, if the elastic piece 32*a* directly touches the first support rod 311 and the second support rod 312, the elastic piece 32*a* may be squeezed against outer end faces of the first swing arm 331 and the second swing arm 341. Consequently, the first swing arm 331 and the second swing arm 341 cannot rotate. The limiting structure 35 that includes the springs 352 and 353 ensures the tightness of the hinge assembly 30*a* during assembly and the up-and-down elasticity of the elastic piece 32*a*. This further ensures the rotatability of the first swing arm 331 and the second swing arm 341.

The limiting structure 35 can limit positions of the elastic piece 32*a*, first support rod 311, and second support rod 312, and help fix the pivot mechanism 31 to the first swing arm 331 and the second swing arm 341. In addition, the limiting structure 35 is provided, and the two ends of the elastic piece 32*a* touch the springs 352 and 353 of the limiting structure 35. During installation, the springs 352 and 353 must be in a compressed state. In this way, when the first protrusion 323 is received by the first groove 3312 and the second protrusion 324 is received by the second groove 3412, the springs 352 and 353 can press the elastic piece 32*a*. As a result, the first protrusion 323 on the elastic piece 32*a* is received by the first groove 3312 and the second protrusion 324 on the elastic piece 32*a* is received by the second groove 3412.

The springs 352 and 353 can be compressed and stretched. Therefore, the elastic piece 32*a* that is connected to the springs 352 and 353 can move along the axis of the pivot mechanism. In this way, when the first swing arm 331 and the second swing arm 341 rotate to a preset location corresponding to the elastic piece 32*a* that is connected to the springs 352 and 353, the first protrusion 323 on the elastic piece 32*a* can be received by the first groove 3312, and the second protrusion 324 can be received by the second groove 3412. When the first swing arm 331 and the second swing arm 341 rotate to a location other than the preset location corresponding to the elastic piece 32*a* that is connected to the springs 352 and 353, the first protrusion 323 on the elastic piece leaves the first groove 3312 and touches the first swing arm 331, and the second protrusion 324 leaves the second groove 3412 and touches the second swing arm 341.

In addition, the limiting structure 35 can reduce abrasions caused between the elastic piece and the first swing arm 331 and the second swing arm 341, and ensure smooth rotation of the first swing arm 331 and the second swing arm 341. This reduces suspension rigidity. Furthermore, this ensures suspension stability and avoids suspension failures that are caused due to insufficient buckling force.

In this embodiment, two limiting structures 35 are provided. One limiting structure 35 is disposed on the outermost elastic piece 32*a* of the first swing arm 331 and the second swing arm 341. The other limiting structure 35 is disposed on the middle elastic piece 32*a*. It should be noted that a quantity of limiting structures 35 may include, but is not limited to, two. In some embodiments, a plurality of limiting structures 35 may be provided. For example, a quantity of limiting structures 35 may equal that of elastic pieces. In this case, each elastic piece corresponds to one limiting structure 35. This ensures that the hinge assembly 30*a* can be smoothly folded. This also ensures suspension stability: In actual application, a specific quantity of limiting structures 35 is determined based on actual conditions, which is not elaborated herein.

Furthermore, a gasket 317 may be provided between the limiting member 351 and the first support rod 311 and the second support rod 312. The gasket 317 can reduce abrasions caused between the limiting member 351 and the first support rod 311 and the second support rod 312.

In this embodiment, as shown in FIG. 8, a first through hole 354 and a second through hole 355 are disposed at two ends of the limiting member 351. The first through hole 354 is passed through by the first support rod 311, and the second through hole 355 is passed through by the second support rod 312 so that the limiting member 351 is rotatably connected to the first support rod 311 and the second support rod 312. At least one spring 352 is disposed on each of the first support rod 311 and the second support rod 312 so that the two ends of the limiting member 351 can be stably supported.

It should be noted that shapes of the first through hole 354 and the second through hole 355 on the limiting member 351 can be the same as those of the first connection hole 325 and the second connection hole 326 on the elastic piece. This ensures that the limiting member 351 can be rotatably connected to the first support rod 311 and the second support rod 312.

A plurality of first connection subparts 3311*a* and second connection subparts 3411*a* are disposed on the first swing arm 331 and the second swing arm 341. This increases the quantity of elastic pieces and allows more suspension angles. Therefore, installation space of the hinge assembly 30*a* along the axis of the pivot mechanism 31 can be fully utilized. This improves the space utilization of the hinge assembly 30*a* along the axis of the pivot mechanism 31.

Figure 12:
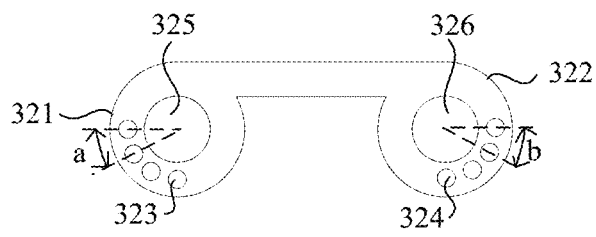
FIG. 12 is a schematic diagram of orthographic projections on an axis of a pivot mechanism for a plurality of elastic pieces in a hinge assembly of a foldable electronic device according to an embodiment of this application.

Still referring to FIG. 8 and FIG. 10, in this embodiment, eight elastic pieces are provided and grouped based on the third and fourth gaps. A group of four elastic pieces that are located in the upper part of the third and fourth gaps are used for description. FIG. 12 is a schematic diagram of orthographic projections on the axis of the pivot mechanism for four elastic pieces in the hinge assembly of the foldable phone provided in this embodiment of this application. As shown in FIG. 12, orthographic projections on the axis of the pivot mechanism 31 for first protrusions 323 on the four elastic pieces are alternately distributed along the circumference of the first support rod 311. An included angle between first protrusions 323 on two adjacent elastic pieces is a first included angle a. The first included angle a may be an angle such as 10°, 20°, 30°, or 45°. Orthographic projections on the axis of the pivot mechanism 31 for second protrusions 324 on the four elastic pieces are alternately distributed along the circumference of the second support rod 312. An included angle between second protrusions 324 on two adjacent elastic pieces is a second included angle b. The second included angle b may be an angle such as 10°, 20°, 30°, or 45°.

The following describes a folding process of the foldable phone with reference to the accompanying drawings.

Figure 13:
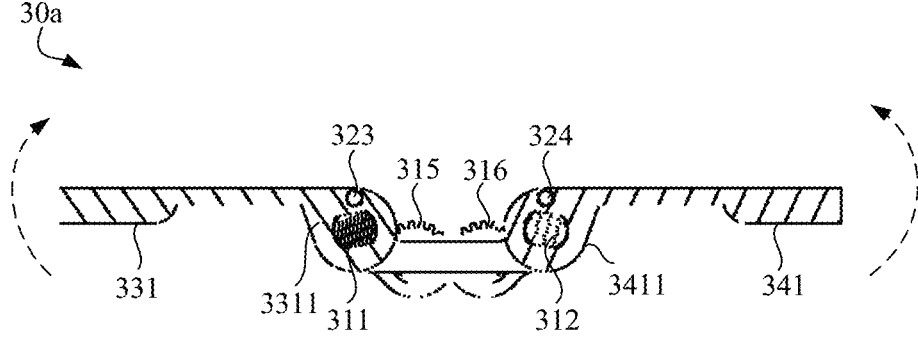
FIG. 13 is a schematic cross-sectional view of a hinge assembly that is of a foldable electronic device and that resides at a first preset location according to an embodiment of this application.
Figure 14:
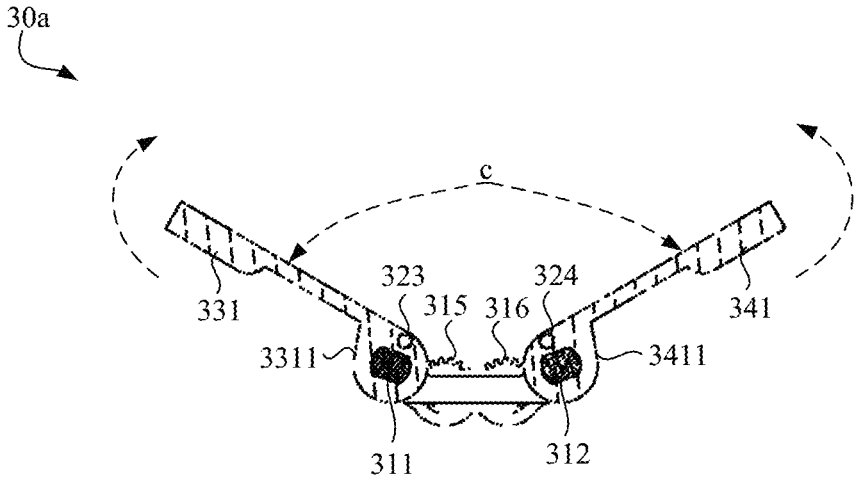
FIG. 14 is a schematic cross-sectional view of a hinge assembly that is of a foldable electronic device and that resides at a second preset location according to an embodiment of this application.
Figure 15:
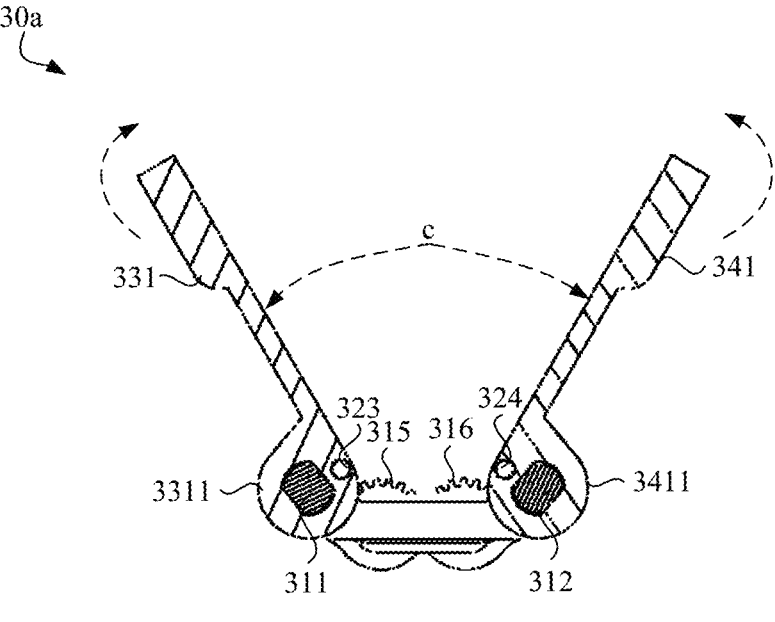
FIG. 15 is a schematic cross-sectional view of a hinge assembly that is of a foldable electronic device and that resides at a third preset location according to an embodiment of this application.
Figure 16:
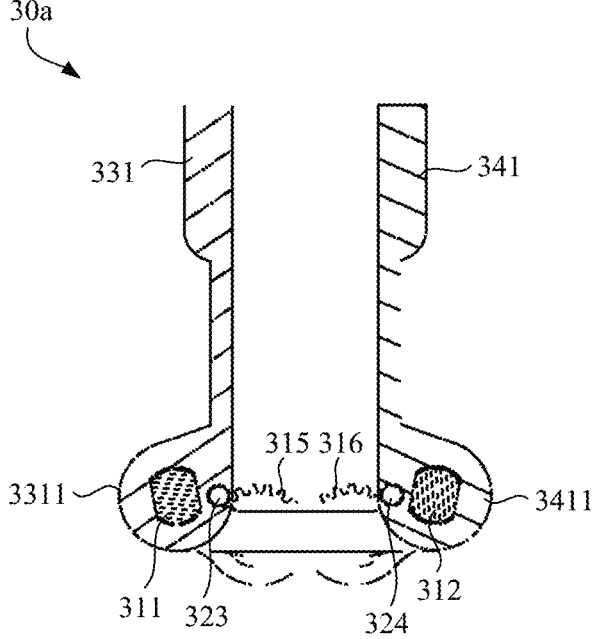
FIG. 16 is a schematic cross-sectional view of a hinge assembly that is of a foldable electronic device and that resides at a fourth preset location according to an embodiment of this application.

FIG. 13 shows a cross section of where the elastic piece 32*d* in FIG. 11 is disposed. In this case, a folding angle for each of the first swing arm 331 and the second swing arm 341 is 0°. The foldable phone is in the fully open state. In other words, an included angle between the first swing arm 331 and the second swing arm 341 is 180°. The folding process of the foldable phone suspends at a first preset location. The first swing arm 331 and the second swing arm 341 rotate inwardly along directions shown by dashed arrows to a location that is shown in FIG. 14. FIG. 14 shows a cross section where the elastic piece 32*c* in FIG. 11 is disposed. In this case, the folding angle for each of the first swing arm 331 and the second swing arm 341 is 30°. An included angle (denoted by c in FIG. 14) between the first swing arm 331 and the second swing arm 341 is 120°. The folding process of the foldable phone suspends at a second preset location. The first swing arm 331 and the second swing arm 341 continue rotating inwardly along directions shown by dashed arrows to a location that is shown in FIG. 15. FIG. 15 shows a cross section where the elastic piece 32*b* in FIG. 11 is disposed. In this case, an included angle (denoted by c in FIG. 15) between the first swing arm 331 and the second swing arm 341 is 60°. The folding process of the foldable phone suspends at a third preset location. The first swing arm 331 and the second swing arm 341 continue rotating inwardly along directions shown by dashed arrows to a location that is shown in FIG. 16. FIG. 16 shows a cross section where the elastic piece 32*a* in FIG. 11 is disposed. In this case, an included angle between the first swing arm 331 and the second swing arm 341 is 0°. The folding process of the foldable phone suspends at a fourth preset location. The foldable phone is in the fully folded state.

Figure 17:
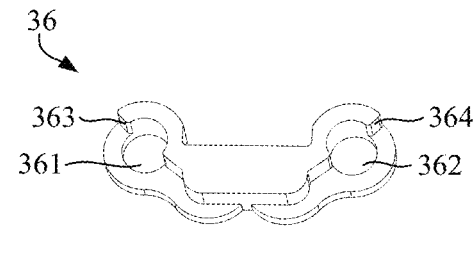
FIG. 17 is a schematic structural diagram of a gear bracket in a hinge assembly of a foldable electronic device according to an embodiment of this application.
Figure 18:
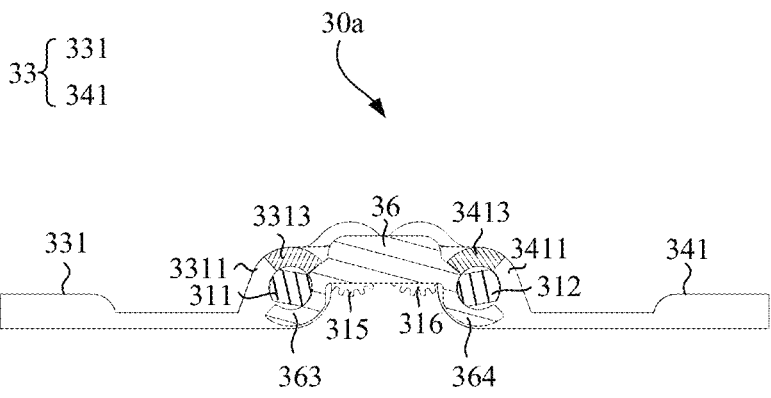
FIG. 18 is a schematic cross-sectional view of a gear bracket in a hinge assembly of a foldable electronic device according to an embodiment of this application.

In this embodiment, as shown in FIG. 17 and FIG. 18, the hinge assembly 30*a* may further include a gear bracket 36. A first assembly hole 361 and a second assembly hole 362 are disposed at two ends of the gear bracket 36. The first assembly hole 361 is passed through by the first support rod 311, and the second assembly hole 362 is passed through by the second support rod 312. This enables the gear bracket 36 to be rotatably connected to the first support rod 311 and the second support rod 312. The gear bracket 36 is disposed at the outsides of the first swing arm 331 and the second swing arm 341. One side of the gear bracket 36 touches the first gear 313 and the second gear 314. The other side of the gear bracket 36 touches the first swing arm 331 and the second swing arm 341.

In addition, in this embodiment, referring to FIG. 8, FIG. 17, and FIG. 18, a retaining part 3313 is disposed at an end of the first swing arm 331 that is connected to the gear bracket 36, and a retaining part 3413 is disposed at an end of the second swing arm 341 that is connected to the gear bracket 36. The retaining part 3313 extends outwards along an outermost end face of the first connection part 3311. The retaining part 3413 extends outwards along an outermost end face of the second connection part 3411. The retaining part 3313 and the retaining part 3413 touch the gear bracket 36. The gear bracket 36 is provided with a limiting part 363 that matches the retaining part 3313 and a limiting part 364 that matches the retaining part 3413. The limiting part 363 is disposed at a side that is of the gear bracket 36 and that is close to the first swing arm 331. The limiting part 364 is disposed at a side that is of the gear bracket 36 and that is close to the second swing arm 341. The limiting parts 363 and 364 are located at two ends of the gear bracket 36 and extend on a surface that is of the gear bracket 36 and that is close to the first swing arm 331 and the second swing arm 341 along directions that are close to the first swing arm 331 and the second swing arm 341. The limiting parts 363 and 364 and retaining parts 3313 and 3413 are arc-shaped walls. The retaining part 3313 and the limiting part 363 are connected in a fitting manner. The retaining part 3413 and the limiting part 364 are connected in a fitting manner. When the retaining part 3313 and the limiting part 363 are in contact, the retaining part 3313 and the limiting parts 363 are blocked by each other. In this case, the foldable phone can no longer be folded or opened. When the retaining part 3413 and the limiting part 364 are in contact, the retaining part 3413 and the limiting parts 364 are blocked by each other. In this case, the foldable phone can no longer be folded or opened.

It should be noted that the retaining parts 3313 and 3413 and the limiting parts 363 and 364 can limit rotations of the first swing arm 331 and the second swing arm 341. In this way, the first swing arm 331 can rotate only within the space between the retaining part 3313 and the limiting part 363, and the second swing arm 341 can rotate only within the space between the retaining part 3413 and the limiting part 364. For example, in this embodiment, the first swing arm 331 and the second swing arm 341 can bend only along a direction in which two ends of the first display approach each other.

In some embodiments, there may be no retaining parts 3313 and 3413 nor limiting parts 363 and 364. In this case, the first swing arm 331 and the second swing arm 341 can rotate inwardly and outwardly.

It should be noted that the retaining parts and limiting parts do not limit the protection scope of the technical solutions provided in this application. In some examples, for example, there may be no retaining parts nor limiting parts on a hinge assembly of a foldable phone that can bend inwardly and outwardly. In this case, another structure can be provided so that the first and second swing arms can rotate within angles from minus 90° to plus 90°.

In the preceding embodiments, orthographic projections for a plurality of grooves are overlapped on the pivot mechanism. In other words, the grooves have fixed positions, and an angle for suspending the folding process of the foldable phone can be determined based on the quantity and positions of protrusions. For example, orthographic projections on the pivot mechanism for different protrusions are alternately distributed along the circumference of the pivot mechanism. One groove corresponds to one or more protrusions.

It should be noted that, in the preceding embodiments, one protrusion can correspond to one groove if there are a plurality of protrusions. Different protrusions correspond to different grooves. In this case, when the rotation mechanism rotates to a preset location, one of the plurality of protrusions is received by one groove, and remaining protrusions in the plurality of protrusions are interposed between the elastic mechanism and the rotation mechanism. When the rotation mechanism rotates to another preset location, another protrusion in the plurality of protrusions is received by another groove, and remaining protrusions in the plurality of protrusions are interposed between the elastic mechanism and rotation mechanism. In addition, it should be noted that orthographic projections for different protrusions at a same preset location are overlapped on the pivot mechanism. In this way, one or more protrusions can be used to control the suspension of the folding process at an angle.

Furthermore, in some embodiments, an angle for suspending the folding process can be determined based on positions of grooves. There may be one elastic piece. A first protrusion on the elastic piece can correspond to a plurality of first grooves, and a second protrusion on the elastic piece can correspond to a plurality of second grooves. When a rotation mechanism rotates to different preset locations, a same first protrusion and a same second protrusion can be received by different grooves.

Figure 19:
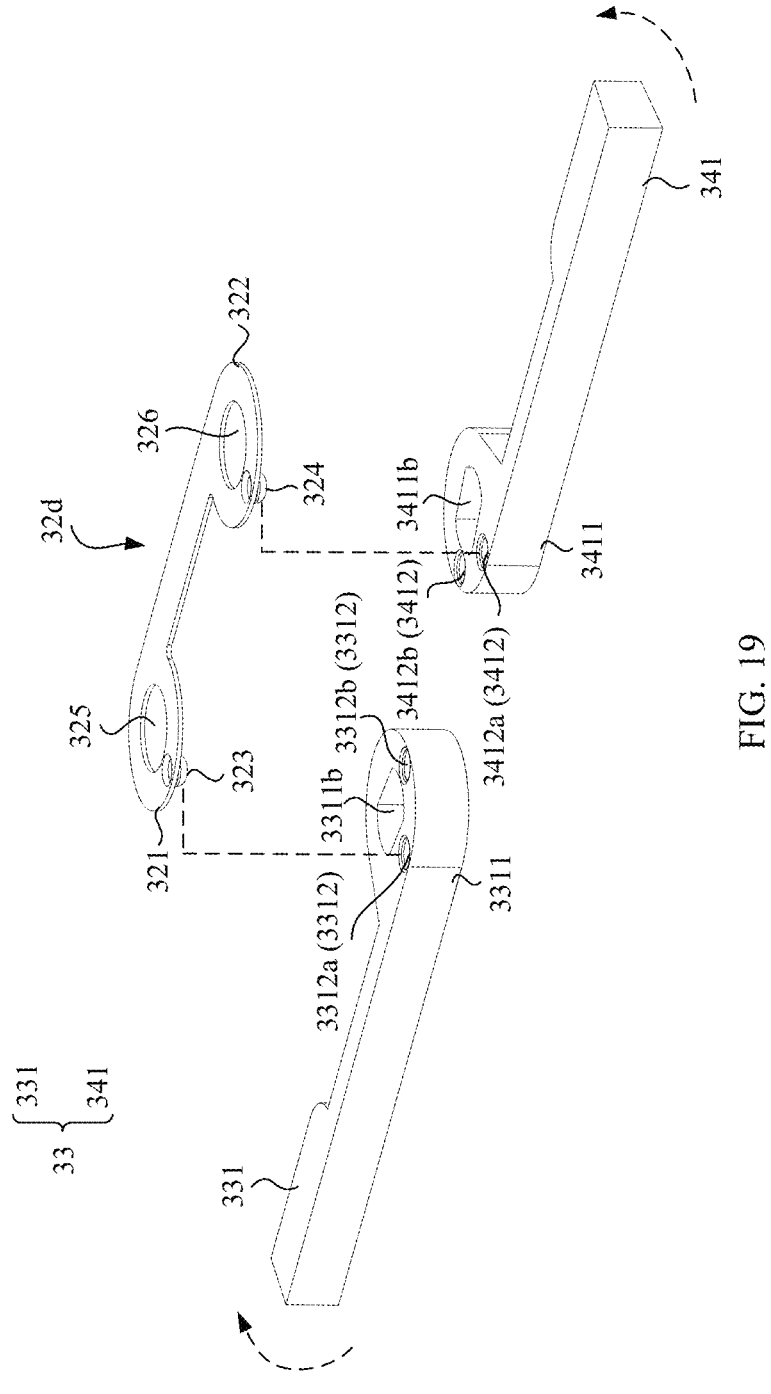
FIG. 19 is an exploded schematic view of an elastic piece and a rotation mechanism in a hinge assembly of a foldable electronic device according to an embodiment of this application.

As shown in FIG. 19, an elastic mechanism 32 includes one elastic piece 32d. A first protrusion 323 on the elastic piece 32d may correspond to a first groove 3312a and a first groove 3312b. A second protrusion 324 on the elastic piece 32d may correspond to a second groove 3412a and a second groove 3412b. The first groove 3312a and the first groove 3312b may be alternately distributed along a circumference of a pivot mechanism 31. The first groove 3312a and the first groove 3312b may be alternately distributed along a circumference of a pivot mechanism 31. In this way, one first groove 3312 and one second groove 3412 can be used to determine a preset location.

As shown in FIG. 19, an end face that is of a first swing arm 331 and on which the first swing arm 331 touches the elastic piece 32d may be provided with the first groove 3312a and the first groove 3312b. The first groove 3312a and the first groove 3312b may be alternately distributed along the circumference of the pivot mechanism 31. An end face that is of a second swing arm 341 and on which the second swing arm 341 touches the elastic piece 32d may be provided with the second groove 3412a and the second groove 3412b. The second groove 3412a and the second groove 3412b may be alternately distributed along the circumference of the pivot mechanism 31. In this way, when the first swing arm 331 rotates to a preset location, the first protrusion 323 can be received by the first groove 3312a, and the second protrusion 324 can be received by the second groove 3412a. The first swing arm 331 and the second swing arm 341 continue rotating. Then, the first protrusion 323 leaves the first groove 3312a, and the second protrusion 324 leaves the second groove 3412a. When the first swing arm 331 and the second swing arm 341 rotate to a second preset location, the first protrusion 323 can be received by the first groove 3312b, and the second protrusion 324 can be received by the second groove 3412b.

In this embodiment, one elastic piece is provided so that one first protrusion 323 corresponds to two first grooves 3312 and one second protrusion 324 corresponds to two second grooves 3412. In this way, the folding process can be suspended at an angle based on one first groove 3312 and one second groove 3412.

It should be noted that respective quantities of first grooves and second grooves in the preceding embodiment may include, but are not limited to, two. There may be two or four first grooves and two or four second grooves, provided that the first grooves are alternately distributed along the circumference of the pivot mechanism and the second grooves are alternately distributed along the circumference of the pivot mechanism. In addition, in an embodiment in which an angle for suspending the folding process is determined based on positions of grooves, a plurality of structures the same as the structure shown in FIG. 19 may be disposed. In this case, there may be a plurality of elastic pieces, orthographic projections for first protrusions on the plurality of elastic pieces may be overlapped on an axis of the pivot mechanism, and orthographic projections for second protrusions on the plurality of elastic pieces may be overlapped on the axis of the pivot mechanism. A plurality of first grooves are provided on a plurality of planes. Each of the plurality of planes include a same quantity of first grooves at same locations. In addition, a plurality of first grooves on a same plane are alternately distributed along the circumference of the first support rod. A plurality of second grooves are provided on a plurality of planes. Each of the plurality of planes include a same quantity of second grooves at same locations. In addition, a plurality of second grooves on a same plane are alternately distributed along the circumference of the second support rod.

It should be noted that a quantity of elastic pieces does not limit the technical solutions of this application. The quantity of elastic pieces can be appropriately adjusted based on suspension angles and a quantity of suspension positions. In addition, a foldable phone needs to be at least fully open and fully folded.

By the way, the folding process of a foldable terminal usually does not need to be suspended at all angles during usage. There are greater demands for suspension at one angle but zero demands for suspension at another angle. Therefore, the protrusion and the groove are provided on the hinge assembly 30a so that the hinge assembly 30a can suspend a folding process at a fixed angle based on a buckling force between the protrusion and the groove. This reduces abrasions between the elastic mechanism 32 and the first swing arm 331 and the second swing arm 34 in the hinge assembly 30a.

In addition, in all preceding embodiments, the first swing arm 331 is fixed to the first support rod 311, and the second swing arm 341 is fixed to the second support rod 312. The first end 321 of the elastic piece is rotatably connected to the first support rod 311, and the second end of the elastic piece is rotatably connected to the second support rod 312. In this way, the elastic piece can be rotatably connected to the first swing arm 331 and the second swing arm 341. However, in some embodiments, the first swing arm 331 can be rotatably connected to the first support rod 311, and the second swing arm 341 can be rotatably connected to the second support rod 312. The first end 321 of the elastic piece is fixed to the first support rod 311, and the second end of the elastic piece is fixed to the second support rod 312. In this way, the elastic piece can be rotatably connected to the first swing arm 331 and the second swing arm 341. Both of the preceding two methods can be used to ensure that, when the first swing arm 331 and the second swing arm 341 rotate, only the first groove 3312 and the second groove 3412 move with the first swing arm 331 and the second swing arm 341, while the first protrusion 323 and the second protrusion 324 remain immobile. When the first swing arm 331 and the second swing arm 341 rotate to a preset location, one of the first protrusions 323 is received by one first groove 3312, and one of the second protrusions 324 is received by one second groove 3412.

It should be noted that, in some examples, the elastic piece can also be fixed to the pivot mechanism 31, and the first swing arm 331 and the second swing arm 341 can be rotatably connected to the pivot mechanism 31. The first gear 313 is fixed to the first swing arm 331, the second gear 314 is fixed to the second swing arm 341, and the mutually engaged third gears 315 and 316 are disposed on the pivot mechanism 31. The first gear 313 is engaged with the third gear 315, and the second gear 314 is engaged with the third gear 316. In this way, synchronous contrarotation can be implemented by rotating the first swing arm 331 or the second swing arm 341.

It should be noted that the elastic piece may be structurally symmetric, as shown in FIG. 10, along the axis of the pivot mechanism 31. Therefore, the first protrusion 323 and the second protrusion 324 that are disposed on a same elastic piece are symmetrical along an axis of the elastic piece. The first included angle a equals the second included angle b. In this embodiment, the first included angle a and the second included angle b each can be 30°. In this case, four first protrusions 323 and four second protrusions 324 can be disposed so that the folding angle for each of the first swing arm 331 and the second swing arm 341 can be 0°, 30°, 60°, and 90°.

It should be noted that this embodiment describes only some structures of the hinge assembly 30a. Some connection structures and fastening structures of the hinge assembly 30a are not shown in this embodiment. It should be noted that other structures of the hinge assembly 30a do not limit the protection scope of the technical solutions provided in this application. A hinge assembly 30a that includes a structure such as the elastic mechanism 32, first swing arm 331, or second swing arm 341 shall fall within the protection scope of the technical solutions provided in this application.

In this embodiment, the elastic mechanism 32 is provided with the protrusion 327, and the rotation mechanism 33 is provided with the groove 332 that matches the protrusion 327. When the rotation mechanism 33 rotates to a preset location, one protrusion 327 is received by one groove 332, and remaining protrusions 327 are interposed between the elastic mechanism 32 and the rotation mechanism 33. When the rotation mechanism 33 rotates to another preset location, another protrusion 327 is received by another groove 332, and remaining protrusions 327 are interposed between the elastic mechanism 32 and rotation mechanism 33. The protrusion and the groove that match each other allow the hinge assembly 30a to suspend a folding process at a fixed angle. In a suspension state, the protrusion is received by the groove. Therefore, suspension stability can be ensured. To suspend a folding process of the hinge assembly 30a by using a protrusion and a groove that match each other can avoid usage of a spring, an upper cam, and a lower cam. Therefore, abrasions between the upper cam and the lower cam can be reduced. In addition, less springs require less installation space along the axis of the pivot mechanism 31. Therefore, the hinge assembly 30a is simplified and costs are reduced.

In addition, the elastic piece in the embodiments of this application is thin and sheet-like. This can reduce the installation space of the hinge assembly 30a along the axis of the pivot mechanism 31, and further simplify the hinge assembly 30a. In addition, this provides more installation space for other parts of the hinge assembly 30a or pivot mechanism 31.

It should be noted that, in some examples, the first protrusion 323 and the second protrusion 324 can alternatively be disposed on the first swing arm 331 and the second swing arm 341, and the first groove 3312 and the second groove 3412 can be disposed on the elastic piece. In this way, the folding process of the foldable phone can also be suspended at a fixed angle. For example, the first protrusion 323 and the first groove 3312 can have their positions switched, and the second protrusion 324 and the second groove 3412 can have their positions switched. This can also reduce abrasions caused between the upper cams and lower cams in the prior art. Positions of the first protrusion 323, second protrusion 324, first groove 3312, and second groove 3412 can be determined based on actual conditions, and therefore do not limit the protection scope of the technical solutions provided in this application. A technical solution in which a protrusion or groove is provided on an elastic piece and suspension of a folding process of the hinge assembly 30a is controlled based on a buckling force between the protrusion and groove falls within the protection scope of the technical solutions provided in this application, which is not elaborated herein.

In the description of the embodiments of this application, it should be noted that unless otherwise expressly specified and defined, terms such as "installation", "connected", and "connected to" should be comprehended in a broad sense. For example, a connection may be a fixed connection, an indirect connection through an intermediate medium, internal communication between two elements, or an interactive relationship between two elements. A person of ordinary skill in the art can understand specific meanings of the foregoing terms in embodiments of this application based on a specific situation.

The device or element referred to in or implied in the embodiments of this specification needs to have a specific orientation, be constructed and operated in a specific orientation, and therefore cannot be construed as a limitation on the embodiments of this specification. In the descriptions of embodiments of this application, "a plurality of" means two or more, unless otherwise specifically defined.

In this specification of embodiments, the claims, and the accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in orders except the order illustrated or described herein. In addition, the terms "including" and "having" and any of their variants are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

Finally, it should be noted that the above embodiments are merely used to explain the technical solutions of this application, but are not intended to limit this application. Although this application is described in detail with reference to the foregoing embodiments, those of ordinary skill in the art should understand that they can still modify the technical solutions described in the foregoing embodiments, or make equivalent substitutions on some or all technical features therein. These modifications or substitutions do not make the essence of the corresponding technical solutions deviate from the spirit and scope of the technical solutions of the embodiments of this application.

What is claimed is:

1. A hinge assembly, comprising a pivot mechanism and an elastic mechanism and a rotation mechanism that are disposed on the pivot mechanism, wherein
    one of the elastic mechanism and the rotation mechanism is fixed to the pivot mechanism, and the other of the elastic mechanism and the rotation mechanism is rotatably connected to the pivot mechanism;
    one of the elastic mechanism and the rotation mechanism is provided with a plurality of protrusions, and the other of the elastic mechanism and the rotation mechanism is provided with a plurality of grooves that match the plurality of protrusions;
    when the rotation mechanism rotates to a preset location, at least one of the plurality of protrusions is received by at least one of the plurality of grooves, and remaining protrusions in the plurality of protrusions are interposed between the elastic mechanism and the rotation mechanism; and
    when the rotation mechanism rotates to another preset location, at least one of the other protrusions in the plurality of protrusions is received by at least one of the other grooves in the plurality of grooves, and remaining protrusions in the plurality of protrusions are interposed between the elastic mechanism and rotation mechanism,
    wherein the rotation mechanism comprises a first swing arm and a second swing arm that are disposed at two sides of the pivot mechanism,
    the elastic mechanism comprises a plurality of elastic pieces, a first end of each elastic piece is provided with a first protrusion, and a second end of the elastic piece is provided with a second protrusion,
    the pivot mechanism comprises a first support rod and a second support rod,
    an orthographic projection for at least one of the first protrusions provided on the plurality of elastic pieces is alternately distributed on an axis of the first support rod along a circumference of the first support rod, and
    an orthographic projection for at least one of a second protrusions provided on the plurality of elastic pieces is alternately distributed on an axis of the second support rod along a circumference of the second support rod.

2. The hinge assembly according to claim 1, wherein
    the elastic mechanism is disposed between the first swing arm and the second swing arm;
    one of the first swing arm and a first end of the elastic mechanism is provided with a plurality of protrusions, and the other of the first swing arm and the first end of the elastic mechanism is provided with a plurality of grooves that match the plurality of protrusions; and one of the second swing arm and a second end of the elastic mechanism is provided with a plurality of protrusions, and the other of the second swing arm and the second end of the elastic mechanism is provided with a plurality of grooves that match the plurality of protrusions.

3. The hinge assembly according to claim 2, wherein the protrusion disposed on the first end of the elastic mechanism is a first protrusion, the protrusion disposed on the second end of the elastic mechanism is a second protrusion, and the first protrusion and the second protrusion are symmetrically disposed along an axis of the pivot mechanism; and
    the groove disposed on the first swing arm is a first groove, the groove disposed on the second swing arm is a second groove, and the first groove and the second groove are symmetrically disposed along the axis of the pivot mechanism.

4. The hinge assembly according to claim 2, wherein
    the first end of the elastic mechanism is passed through by the first support rod, the second end of the elastic mechanism is passed through by the second support rod, and the elastic mechanism is rotatably connected to the first support rod and the second support rod;
    one end of the first swing arm is passed through by the first support rod, the end of the first swing arm corresponds to the first end of the elastic mechanism, and the first swing arm is fixed to the first support rod; and
    one end of the second swing arm is passed through by the second support rod, the end of the second swing arm corresponds to the second end of the elastic mechanism, and the second swing arm is fixed to the second support rod.

5. The hinge assembly according to claim 3, wherein
    the first end of the elastic piece is passed through by the first support rod, the second end of the elastic piece is passed through by the second support rod, and the elastic piece is rotatably connected to the first support rod and the second support rod;
    the first swing arm is provided with a first connection part on which the first groove is disposed;
    the second swing arm is provided with a second connection part on which the second groove is disposed; and
    the plurality of elastic pieces are disposed between the first connection part and the second connection part.

6. The hinge assembly according to claim 1, wherein
    orthographic projections for a plurality of first grooves disposed on the first swing arm are overlapped on the axis of the first support rod; and
    orthographic projections for a plurality of second grooves disposed on the second swing arm are overlapped on the axis of the second support rod.

7. The hinge assembly according to claim 1, wherein a first connection part comprises a plurality of first connection subparts that are alternately distributed and passed through by the first support rod, and a second connection part comprises a plurality of second connection subparts that are alternately distributed and passed through by the second support rod; and
    a first end of at least one of the plurality of elastic pieces is disposed between two adjacent first connection subparts, and a second end of at least one of the plurality of elastic pieces is disposed between two adjacent second connection subparts.

8. The hinge assembly according to claim 7, wherein respective quantities of first connection subparts and second connection subparts equal a quantity of elastic pieces;

a first end of at least one of the plurality of elastic pieces is disposed between two adjacent first connection subparts, and a second end of at least one of the plurality of elastic pieces is disposed between two adjacent second connection subparts;

a first end of at least one of the plurality of elastic pieces is disposed at an outside of an outermost first connection subpart, and a second end of at least one of the plurality of elastic pieces is disposed at an outside of an outermost second connection subpart;

each of the plurality of first connection subparts is provided with a first groove, and orthographic projections for first grooves provided on the plurality of first connection subparts are overlapped on the axis of the first support rod; and each of the plurality of second connection subparts is provided with a second groove, and orthographic projections for second grooves provided on the plurality of second connection subparts are overlapped on the axis of the second support rod.

9. The hinge assembly according to claim 1, wherein the elastic mechanism further comprises a limiting structure that touches the elastic piece, wherein the limiting structure comprises a limiting member and two springs that are disposed at two ends of the limiting member, wherein one end of the spring touches the elastic piece and the other end of the spring touches the limiting member.

10. The hinge assembly according to claim 9, wherein one limiting structure is provided, the limiting structure is disposed at outsides of a first swing arm and a second swing arm, one side of the limiting member touches a first support rod and a second support rod, and the other side of the limiting member touches the spring.

11. The hinge assembly according to claim 9, wherein a plurality of limiting structures are provided, wherein at least one of the limiting structures is disposed at outsides of a first swing arm and a second swing arm, one side of the limiting member touches a first support rod and a second support rod, and the other side of the limiting member touches the spring; and at least one of the other limiting structures is disposed between two adjacent first connection subparts and two adjacent second connection subparts, one side of the limiting member touches the first connection subpart and the second connection subpart, and the other side of the limiting member touches the spring.

12. The hinge assembly according to claims 9, wherein a first through hole and a second through hole are disposed at two ends of the limiting member, the first through hole is passed through by a first support rod, and the second through hole is passed through by a second support rod so that the limiting bracket is rotatably connected to the first support rod and the second support rod; and at least one spring is disposed on each of the first support rod and the second support rod.

13. The hinge assembly according to claim 9, wherein a first connection part is provided with a first mounting hole and a second connection part is provided with a second mounting hole;

a first end of the elastic piece is provided with a first connection hole and a second end of the elastic piece is provided with a second connection hole;

the first mounting hole and the first connection hole are passed through by the first support rod;

a first support rod is fixed to a first swing arm and rotatably connected to the first end of the elastic piece;

the second mounting hole and the second connection hole are passed through by a second support rod; and the second support rod is fixed to a second swing arm and rotatably connected to the second end of the elastic piece.

14. The hinge assembly according to claim 13, wherein a first gear is fixed to one end of the first support rod and a second gear is fixed to one end of the second support rod; and two mutually engaged third gears that each are separately engaged with the first gear and the second gear are disposed between the first swing arm and the second swing arm.

15. The hinge assembly according to claim 14, wherein the hinge assembly further comprises a gear bracket, wherein a first assembly hole and a second assembly hole are disposed at two ends of the gear bracket;

the first assembly hole is passed through by the first support rod, and the second assembly hole is passed through by the second support rod so that the gear bracket is rotatably connected to the first support rod and the second support rod;

the gear bracket is disposed at the outsides of the first swing arm and the second swing arm; and one side of the gear bracket touches the first, second, and third gears, and the other side of the gear bracket touches the first swing arm and the second swing arm.

16. The hinge assembly according to claim 15, wherein a retaining part is disposed at an end that is of the first swing arm that is connected to the gear bracket, wherein the retaining part extends outwards along outermost end faces of the first connection part and the second connection part;

the retaining part touches the gear bracket; and the gear bracket is provided with a limiting part that matches the retaining part, the retaining part is disposed at a side that is of the gear bracket and that is close to the first swing arm and the second swing arm, two limiting parts are located at two ends of the gear bracket, and the limiting parts extend on a surface of the gear bracket along directions that are close to the first swing arm and the second swing arm.

17. The hinge assembly according to claim 16, wherein the limiting part is an arc-shaped wall;

the retaining part is an arc-shaped wall; and the retaining part and the limiting part are connected in a fitting manner, and the limiting part can rotate in relation to the retaining part.

18. A foldable electronic device, comprising:

a hinge assembly, the hinge assembly including:

a pivot mechanism and an elastic mechanism and a rotation mechanism that are disposed on the pivot mechanism, wherein one of the elastic mechanism and the rotation mechanism is fixed to the pivot mechanism, and the other of the elastic mechanism and the rotation mechanism is rotatably connected to the pivot mechanism;

one of the elastic mechanism and the rotation mechanism is provided with a plurality of protrusions, and the other of the elastic mechanism and the rotation mechanism is provided with a plurality of grooves that match the plurality of protrusions;

when the rotation mechanism rotates to a preset location, at least one of the plurality of protrusions is received by at least one of the plurality of grooves, and remaining protrusions in the plurality of protrusions are interposed between the elastic mechanism and the rotation mechanism; and when the rotation mechanism rotates to another preset location, at least one of the other protrusions in the plurality of protrusions is received by at least one of the other grooves in the plurality of grooves, and remaining protrusions in the plurality of protrusions are interposed between the elastic mechanism and rotation mechanism, wherein the rotation mechanism comprises a first swing arm and a second swing arm that are disposed at two sides of the pivot mechanism, the elastic mechanism comprises a plurality of elastic pieces, a first end of each elastic piece is provided with a first protrusion, and a second end of the elastic piece is provided with a second protrusion, the pivot mechanism comprises a first support rod and a second support rod, an orthographic projection for at least one of the first protrusions provided on the plurality of elastic pieces is alternately distributed on an axis of the first support rod along a circumference of the first support rod, and an orthographic projection for at least one of a second protrusions provided on the plurality of elastic pieces is alternately distributed on an axis of the second support rod along a circumference of the second support rod.

19. The foldable electronic device according to claim 18, further comprising a foldable first display, a battery cover, a first structure, and a second structure, wherein the first structure and the second structure are located at two sides of the hinge assembly and rotatably connected to a rotation mechanism in the hinge assembly; and the battery cover and the first display are located on surfaces at two sides of the hinge assembly, first structure, and second structure.

20. The foldable electronic device according to claim 19, further comprising a second display, wherein the first display is located on surfaces at one side of the hinge assembly, first structure, and second structure; and the second display and the battery cover are located on surfaces at the other side of the first structure and second structure.

* * * * *